US008543816B2

(12) United States Patent
Mercer

(10) Patent No.: US 8,543,816 B2
(45) Date of Patent: Sep. 24, 2013

(54) SECURE, AUDITABLE FILE EXCHANGE SYSTEM AND METHOD

(75) Inventor: Thomas Mercer, Seattle, WA (US)

(73) Assignee: File Drop Vault LLC, Seattle, WA (US)

( * ) Notice: Subject to any disclaimer, the term of this patent is extended or adjusted under 35 U.S.C. 154(b) by 0 days.

(21) Appl. No.: 13/210,245

(22) Filed: Aug. 15, 2011

(65) Prior Publication Data

US 2012/0047365 A1 Feb. 23, 2012

Related U.S. Application Data

(60) Provisional application No. 61/374,784, filed on Aug. 18, 2010.

(51) Int. Cl.
H04L 9/32 (2006.01)
H04L 29/06 (2006.01)
G06Q 50/00 (2012.01)

(52) U.S. Cl.
USPC ........... 713/168; 713/150; 713/155; 713/170; 705/2; 705/3

(58) Field of Classification Search
USPC ................ 709/217–219, 248; 705/1.1, 2, 3, 705/50–51; 713/150, 153, 182–184, 168, 713/170
See application file for complete search history.

(56) References Cited

U.S. PATENT DOCUMENTS

| 6,874,085 B1 * | 3/2005 | Koo et al. .................... 713/165 |
| 7,308,579 B2 * | 12/2007 | Abela ......................... 713/182 |
| 7,406,596 B2 * | 7/2008 | Tararukhina et al. ......... 713/165 |
| 7,798,961 B1 * | 9/2010 | Bakhshandeh ............... 600/300 |
| 8,260,862 B2 * | 9/2012 | Chatterjee .................... 709/206 |
| 8,423,385 B2 * | 4/2013 | Radoccia et al. ................. 705/3 |
| 2001/0014884 A1 * | 8/2001 | Dillard et al. .................. 705/57 |
| 2002/0016910 A1 * | 2/2002 | Wright et al. ................. 713/150 |
| 2002/0104022 A1 | 8/2002 | Jorgenson et al. |
| 2002/0178366 A1 * | 11/2002 | Ofir ............................. 713/182 |
| 2003/0007645 A1 * | 1/2003 | Ofir ............................. 380/282 |
| 2003/0177422 A1 * | 9/2003 | Tararoukhine et al. ......... 714/48 |
| 2004/0125957 A1 * | 7/2004 | Rauber et al. ................. 380/259 |
| 2005/0055422 A1 | 3/2005 | Campbell et al. |
| 2005/0071632 A1 * | 3/2005 | Pauker et al. ................. 713/165 |
| 2005/0159984 A1 * | 7/2005 | Hirano et al. .................... 705/3 |
| 2007/0136572 A1 * | 6/2007 | Chen et al. .................... 713/153 |
| 2008/0021834 A1 * | 1/2008 | Holla et al. ..................... 705/51 |
| 2008/0155057 A1 * | 6/2008 | Khedouri et al. ............. 709/217 |
| 2008/0270524 A1 | 10/2008 | Gupta et al. |
| 2010/0262545 A1 * | 10/2010 | Herlitz ............................ 705/51 |

OTHER PUBLICATIONS

Preneel Bart. (Feb. 2003). "Analysis and Design of Cryptographic Hash Functions". Retrieved Feb. 24, 2013.

(Continued)

Primary Examiner — Tae Kim
(74) Attorney, Agent, or Firm — Aeon Law; Adam L. K. Philipp

(57) ABSTRACT

Secure and auditable file exchange between a professional and a client, patient, colleague, or other associate of the professional may be achieved via a file exchange service that automatically verifies the professional's professional status and identity and provides applications and/or tools to accept files for transfer to the verified professional. The files are stored in encrypted form, along with cryptographic integrity codes. After the files have been transferred to the professional, the cryptographic integrity codes may be used to verify that the professional received a correct copy of the file that was originally provided.

28 Claims, 13 Drawing Sheets

(56) References Cited

OTHER PUBLICATIONS

CertifiedMail—Secure Email Software and On-Demand Managed Services, www.certifiedmail.it/eng/lft.htm, Jun. 22, 2010.
CertifiedMail Secure Messaging System—Technology Overview, CertifiedMail, Inc., 2006.
MyDocs Online, Customer Upload Page, www.mydocsonline.com, Jun. 22, 2010.
MyDocs Online, Information Center, www.mydocsonline.com/info_center.html, Jun. 22, 2010.
GoogleHealth Tour, www.googlehealth.com/intl/en/health/tour/index.html, Jun. 30, 2010.
About GoogleHealth, www.googlehealth.com/intl/en/health/about/index.html, Jun. 30, 2010.
HealthUnity Datasheet—HealthUnity Appliance for HealthVault, www.healthunity.com, Jun. 30, 2010.
SendThisFile FAQ, www.sendthisfile.com/info/faq.jsp#three, Jun. 22, 2010.
What HealthVault can do for you, www.healthvault.com/personal/websites-overview.aspx, Jun. 30, 2010.
How HealthVault Works for Physicians, www.healthvault.com/industry/ecosystem/physicians/index.aspx, Jun. 30, 2010.
YouSendIt, Receiving Large Files, www.yousendit.com/solutions/receive-large-files, Jun. 22, 2010.
YouSendIt, Secure File Transfer, www.yousendit.com/solutions/secure-file-transfer, Jun. 22, 2010.
YouSendIt, YouSendIt Seven-Layer Security Policy, www.yousendit.com/security-overview, Jun. 22, 2010.
YouSendIt, SiteDrop, www.yousendit.com/plans/sitedrop, Jun. 22, 2010.
SendThisFile, FileBox Details, www.sendthisfile.com/info/fileboxes,jsp, Jun. 22, 2010.
MyDocsOnline, MDO Transporter Requires Java, www.mydocsonline.com/transporter.html, Jun. 22, 2010.

\* cited by examiner

SECURE, AUDITABLE FILE EXCHANGE SYSTEM AND METHOD

CROSS-REFERENCE TO RELATED APPLICATION

This application claims the benefit of priority to U.S. Provisional Application No. 61/374,784, filed Aug. 18, 2010, titled "SECURE, AUDITABLE FILE EXCHANGE SYSTEM AND METHOD," and naming inventor Thomas Mercer. The above-cited application is incorporated herein by reference in its entirety, for all purposes.

FIELD

The present disclosure relates to networked computing, and, more particularly, to systems and methods for facilitating secure, auditable file exchange between two networked devices.

BACKGROUND

Professionals, such as doctors, lawyers, accountants, and the like, often need to exchange confidential and/or sensitive files with their clients, colleagues, and/or associates, via a computer network. Numerous protocols exist to transfer files across a network, including File Transfer Protocol ("FTP"), SSH File Transfer Protocol (also referred to as Secure File Transfer Protocol or "SFTP"), transparent file transfers over a network file system, and the like. However, many such protocols can be difficult to utilize for users who may not have easy access to technical-support resources. In addition, many file transfer protocols may require the sender and/or to receiver to install and configure dedicated client software.

Consequently, in many cases, professionals and their clients end up using email to exchange files as attachments. Email is ubiquitous, and avoids the need for the sender and/or receiver to install and/or configure dedicated file transfer software. However, email may often be unreliable for exchanging files, as many email providers and gateways may restrict file attachments that are over a certain size and/or that are of certain types. For example, some email gateways may forbid files in the ZIP data compression format due to security concerns, as ZIP files have been used as vectors to propagate malware. Email messages may also be blocked (e.g., by SPAM filters) and/or delayed for many reasons.

In addition, files transferred via email or other file transfer protocols may be corrupted and/or tampered with during and/or after transfer, and it may be difficult to verifiably determine that a client or a professional actually received the exact file that was sent at a particular time.

DESCRIPTION

Figure 1:
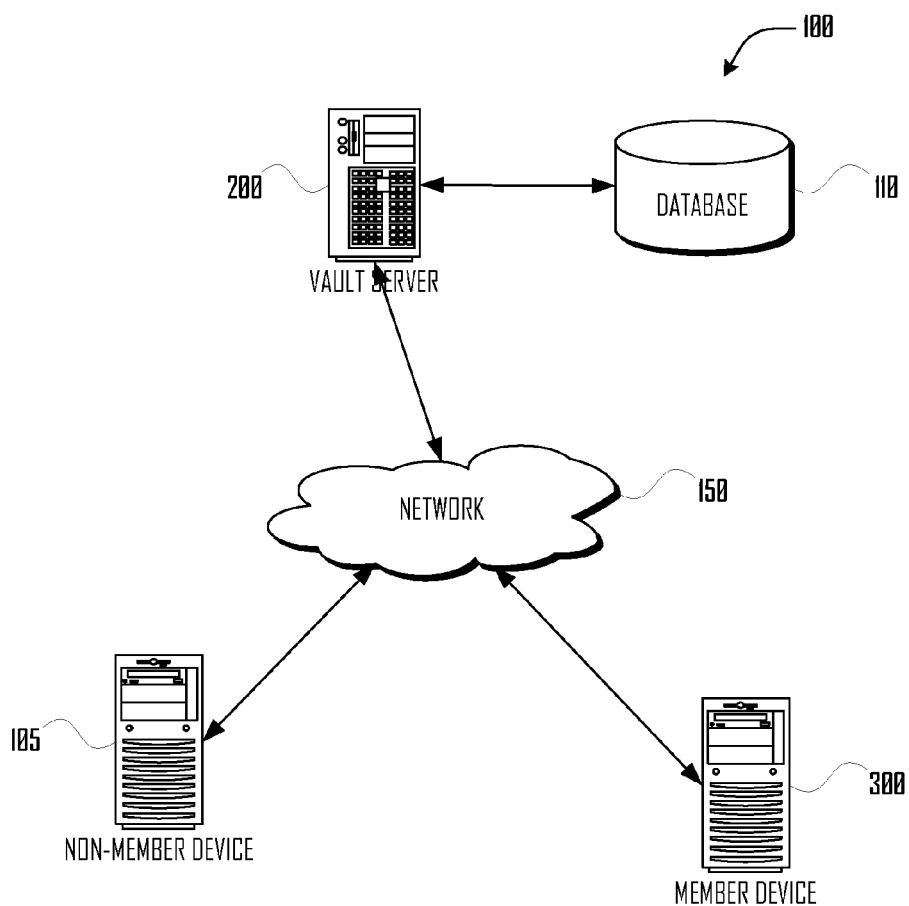
FIG. 1 illustrates an exemplary file transfer system in accordance with one embodiment.

The detailed description that follows is represented largely in terms of processes and symbolic representations of operations by conventional computer components, including a processor, memory storage devices for the processor, connected display devices and input devices. Furthermore, these processes and operations may utilize conventional computer components in a heterogeneous distributed computing environment, including remote file servers, computer servers, and/or memory storage devices. Each of these conventional distributed computing components is accessible by the processor via a communication network.

The phrases "in one embodiment," "in various embodiments," "in some embodiments," and the like are used repeatedly. Such phrases do not necessarily refer to the same embodiment. The terms "comprising," "having," and "including" are synonymous, unless the context dictates otherwise.

Reference is now made in detail to the description of the embodiments as illustrated in the drawings. While embodiments are described in connection with the drawings and related descriptions, there is no intent to limit the scope to the embodiments disclosed herein. On the contrary, the intent is to cover all alternatives, modifications, and equivalents. In alternate embodiments, additional devices, or combinations of illustrated devices, may be added to, or combined, without limiting the scope to the embodiments disclosed herein.

FIG. 1 illustrates an exemplary file transfer system 100, in which vault server 200 acts as a file-transfer intermediary, enabling member device 300 to verifiably receive a file uploaded by a non-member device 105 via, network 150 in accordance with one embodiment. Uploaded files are temporarily stored (in encrypted form) in database 110, which also stores transaction data allowing for a verifiable chain of custody to be established for files transferred via vault server 200. In some embodiments, database 110 may also store other information related to user accounts and/or devices. In some embodiments, vault server 200 may communicate with database 110 via network 150, a storage area network ("SAN"), a high-speed serial bus, and/or via other suitable communication technology.

In some embodiments, other servers and/or devices (not shown) may also be present. For example, in many embodiments, multiple additional member devices and/or non-member devices may be present. In some embodiments, non-member device 105 may act as a "sponsored member" device, to verifiably receive files from, as well as send files to, member device 300. In some embodiments, vault server 200 and/or database 110 may comprise one or more replicated and/or distributed physical or logical devices. In some embodiments, vault server 200 and/or database 110 may comprise one or more computing resources provisioned from a "cloud computing" provider. In various embodiments, network 150 may include the Internet, a local area network ("LAN"), a wide area network ("WAN"), a cellular data network, and/or other data network.

Figure 2:
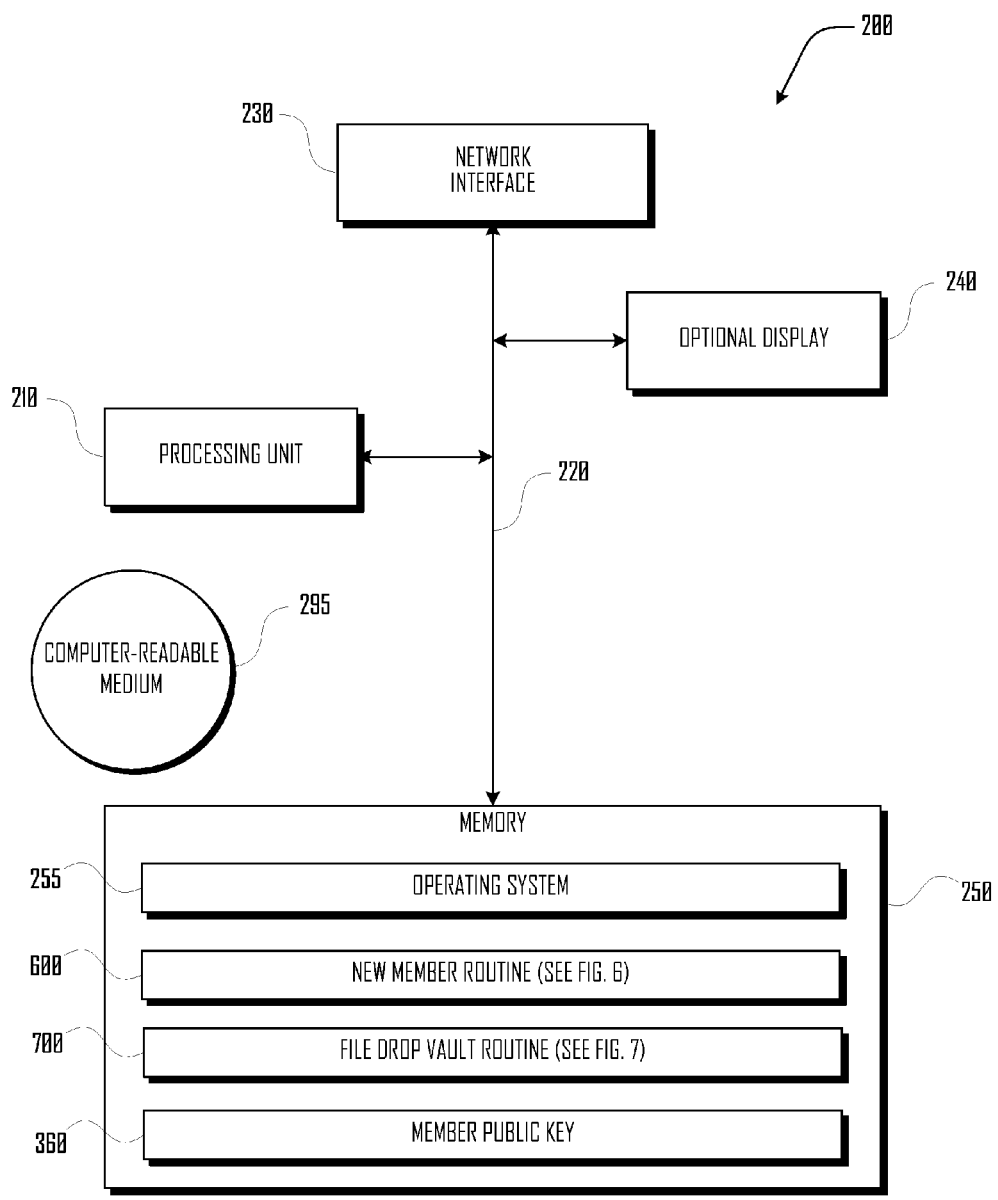
FIG. 2 illustrates several components of an exemplary vault server in accordance with one embodiment.

FIG. 2 illustrates several components of an exemplary vault server 200 in accordance with one embodiment. In some embodiments, vault server 200 may include many more components than those shown in FIG. 2. However, it is not necessary that all of these generally conventional components be shown in order to disclose an illustrative embodiment. As shown in FIG. 2, vault server 200 includes a network interface 230 for connecting to the network 150.

The vault server 200 also includes a processing unit 210, a memory 250, and an optional display 240, all interconnected along with the network interface 230 via a bus 220. The memory 250 generally comprises a random access memory ("RAM"), a read only memory ("ROM"), and a permanent mass storage device, such as a disk drive. The memory 250 stores program code for a new member routine 600 (see FIG. 6, discussed below) and a file drop vault routine 700 (see FIG. 7, discussed below). In addition, the memory 250 also stores an operating system 255, and member public key 360 (see FIG. 3, discussed below). These software components may be loaded into memory 250 of the vault server 200 using a drive mechanism (not shown) associated with a non-transient computer readable storage medium 295, such as a floppy disc, tape, DVD/CD-ROM drive, memory card, or the like. In some embodiments, software components may alternately be loaded via the network interface 230, rather than via a non-transient computer readable storage medium 295.

Notification server 200 also communicates via bus 220 with database 110 (see FIG. 1). In various embodiments, bus 220 may comprise a storage area network ("SAN"), a high-speed serial bus, and/or via other suitable communication technology. In some embodiments, vault server 200 may communicate with database 110 via network interface 230.

Figure 3:
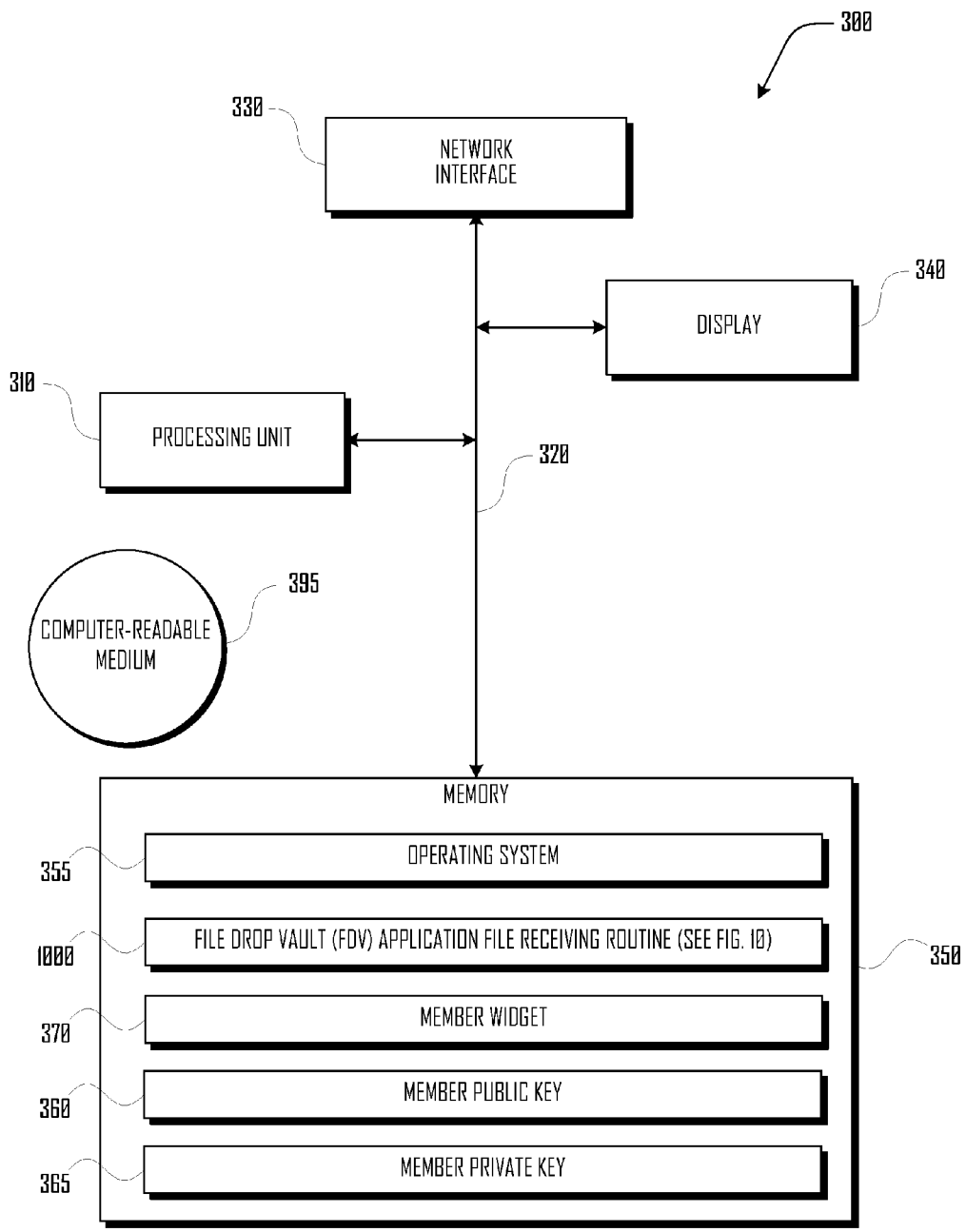
FIG. 3 illustrates several components of an exemplary member device in accordance with one embodiment.

FIG. 3 illustrates several components of an exemplary member device 300 in accordance with one embodiment. In some embodiments, member device 300 may include many more components than those shown in FIG. 3. However, it is not necessary that all of these generally conventional components be shown in order to disclose an illustrative embodiment. As shown in FIG. 3, the member device 300 includes a network interface 330 for connecting to the network 150.

The member device 300 also includes a processing unit 310, a memory 350, and a display interface 340, all interconnected along with the network interface 330 via a bus 320. The memory 350 generally comprises a random access memory ("RAM"), a read only memory ("ROM"), and a permanent mass storage device, such as a disk drive, flash device, or the like.

The memory 350 stores program code for, among other things, a file-drop-vault-application file receiving routine 1000 (see FIG. 10, discussed below), as well as program code and/or an identifier for member widget 370, member public key 360, and member private key 365. In addition, the memory 350 also stores an operating system 355. These software components may be loaded into memory 350 of the member device 300 using a read mechanism (not shown) associated with a non-transient computer readable storage medium 395, such as a floppy disc, tape, DVD/CD-ROM drive, memory card, or the like. In some embodiments, software components may alternately be loaded via the network interface 330, rather than via a non-transient computer readable storage medium 395.

Although an exemplary member device 300 has been described that generally conforms to conventional general purpose computing devices, a member device 300 may be any of a great number of devices capable of communicating with the network 150 and receiving file transfers, for example, a personal computer, a game console, a set-top box, a handheld computer, a cell phone, or any other suitable device.

In some embodiments, non-member device 105 may also be substantially similar to member device 300, differing primarily in the contents of memory 350. For example, non-member device 105 may not ordinarily include program code and/or an identifier for member widget 370. Similarly, unless non-member device 105 were sponsored by a member (see, e.g., FIG. 5, discussed below), non-member device 105 may not ordinarily include program code for file-drop-vault-application file receiving routine 1000.

Figure 4:
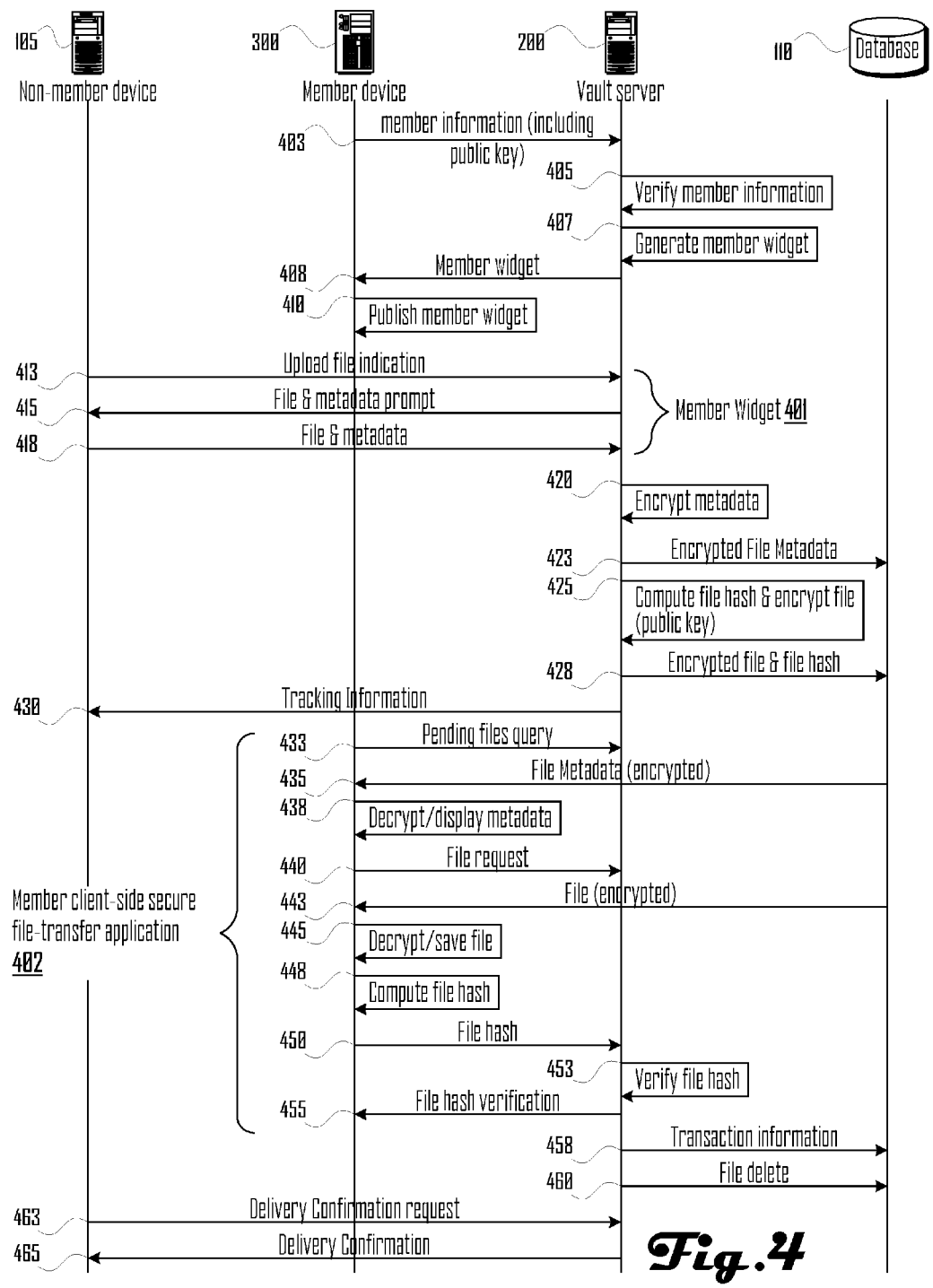
FIGS. 4-5 illustrate exemplary communications between non-member device, member device, vault server, and database, in accordance with various embodiments.

FIG. 4 illustrates an exemplary series of communications between non-member device 105, member device 300, vault server 200, and database 110, in accordance with one embodiment. The illustrated series of communications shows an exemplary scenario in which non-member device 105 verifiably or auditably uploads a file to member device 300 via vault server 200.

According to the illustrated scenario, member device 300 first establishes a verified-professional member account with a file-exchange service provided by vault server 200. To that end, beginning the illustrated sequence of operations, member device 300 provides 403 to vault server 200 information associated with a new member of the file-exchange service provided by vault server 200, the new-member information including a public key of a public/private key pair (e.g., member public key 360/member private key 365) for the new member. In various embodiments, the provided new-member information may include member contact information or other identity information associated with the member, as well as professional credentials, such as a professional license number (e.g., an attorney's bar number, a CPA's license number, a physician's license number, or the like), professional firm or entity identifier (e.g., a law firm identifier, a hospital identifier, a clinical practice identifier, or the like), or the like.

In alternate embodiments, member public key 360 may not be included in the member information provided by member device 300. Rather, in such embodiments, vault server 200 may generate and send (not shown) to member device 300 a public/private key pair, storing (not shown) the public key in database 110 and discarding (not shown) the member private key after sending it to member device 300.

In some embodiments, member information may be provided 403 to vault server 200 via a web interface. In other embodiments, member device 300 may have previously downloaded (not shown) a client-side secure file-transfer application from member device 300, in which case the client-side secure file-transfer application may collect member information from the user, generate a public/private key pair, and provide 403 member information and the public key to vault server 200. In one embodiment, vault server 200 never receives, nor even transiently stores, the private key corresponding to the member public key.

Vault server 200 verifies 405 the new-member information For example, in one embodiment, vault server 200 may look up a professional license number in an online-accessible data store of professional licensing information and compare the member-provided contact information with that obtained from the professional licensing data store. In some embodiments, vault server 200 may automatically search a public or private data store to determine whether an identified professional firm actually exists, and if so, whether the firm actually employs a professional corresponding to provided new-member identifying information.

When the member's information is verified, vault server 200 generates 407 a member "widget" configured to accept files submitted for secure transfer to the member. In some embodiments, the member widget may comprise an "applet" or other web-upload tool that may be embedded in the member's web page, in which case vault server 200 may send program code corresponding to the applet to member device 300. In various embodiments, such an "applet" may comprise a Java application, an Adobe Flash document, a Microsoft Silverlight document, and the like. In one embodiment, the generated member widget includes a unique identifier corresponding to the member. In various embodiments, the member widget may use an inline frame (or "iframe") or other mechanism to ensure that file and metadata uploads are transferred directly to vault server 200 via a controlled and encrypted communication channel. For example, in one embodiment, the member widget may actually execute on vault server 200, providing a communications channel protected by Transport Layer Security ("TLS"), Secure Socket Layer (SSL), or other cryptographic protocols that make it difficult or impracticable to observe and/or tamper with communications over networks such as the Internet.

Vault server 200 sends 408 the member widget and/or an identifier corresponding to the member widget to member device 300. For example, in one embodiment, vault server 200 may send a Uniform Resource Locator ("URL") or Uniform Resource Identifier ("URI") corresponding to the generated member widget.

In some embodiments, if member device 300 has not previously downloaded a client-side secure file-transfer application vault server 200 may at this point also send (not shown) a client-side secure file-transfer application to member device 300.

Figure 12:
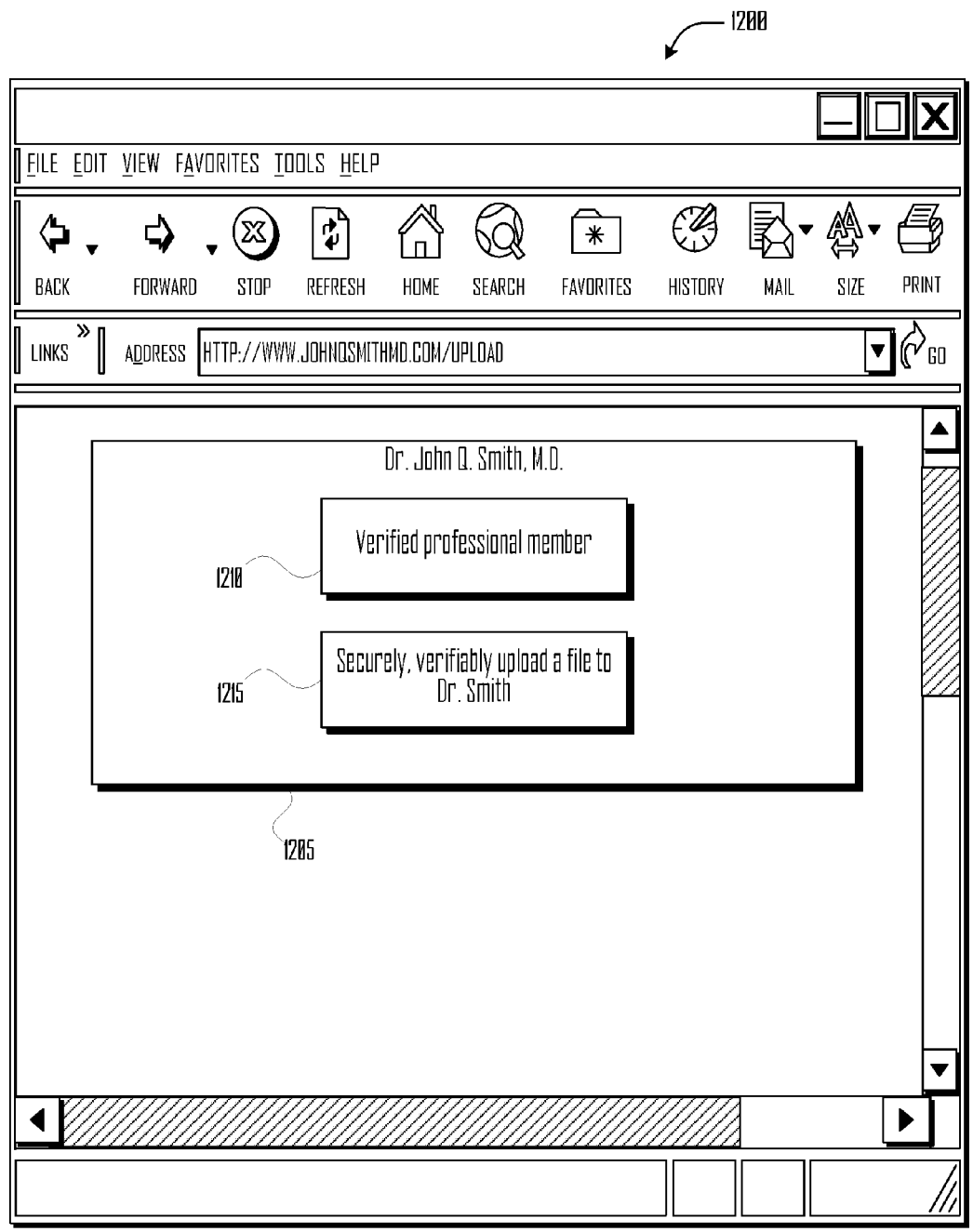
FIG. 12 illustrates an embedded member widget in accordance with one embodiment.

Member device 300 publishes 410 the member widget according to the received widget and/or widget identifier. (See FIG. 12, showing an exemplary widget embedded in a web page.) For example, in some embodiments, publishing the member widget may comprise adding a widget identifier into a web page published by a web server (not shown) operated by or on behalf of the member. In one embodiment, the published member widget may be embedded on such a web page as an inline frame or via another mechanism that refers to code running on or behalf of vault server 200.

At some point after the widget is published, non-member device 105 interacts with the published member widget 401 to provide a file for secure transfer to member device 300. In one embodiment, non-member device 105 may be operated by a client or patient of the verified-professional member, and the file to be uploaded may comprise sensitive information, such as medical or financial records, business documents, and the like. Non-member device 105 sends 413 an indication to upload the file for subsequent retrieval by the member.

In response, published member widget 401 prompts 415 non-member device 105 to identify the file to be uploaded and to provide associated metadata (e.g., information related to the contents of the file, a message to accompany the file, and the like). In one embodiment, some or all such uploaded-provided metadata may be considered "secure metadata," as discussed below. In some embodiments, published member widget 401 may also automatically determine certain metadata corresponding to the file upload request, such as an identifier corresponding to the intended member-recipient of the file, the time of the request, the size of the file, the Internet Protocol ("IP") address of the non-member device 105, and the like.

Non-member device 105 provides 418 the identified file and any uploader-provided metadata to vault server 200 via published member widget 401. In one embodiment, published member widget 401 provides a secure and/or encrypted communication pathway between non-member device 105 and vault server 200.

Vault server 200 identifies (not shown) the member for whom the file is destined, e.g., via a member identifier provided by published member widget 401. Vault server 200 then encrypts 420 some or all of the file metadata using the identified member's public key. In one embodiment, vault server 200 may encrypt the metadata according to the Advanced Encryption Standard ("AES") symmetric-key encryption standard, according to the RSA public-key cryptography algorithm, or according to another suitable encryption standard or combination of encryption standards (e.g., encrypting the metadata according to AES, and encrypting the AES key using an RSA public key of the recipient).

Vault server 200 stores 423 the encrypted metadata in database 110. In some embodiments, vault server 200 may encrypt only "secure" or sensitive metadata that may have been provided by the uploader, storing non-secure or non-sensitive metadata (e.g., the time of the upload, IP address of the uploader, the size of the file, and the like) unencrypted in database 110.

Vault server 200 computes 425 a reference cryptographic integrity code (e.g., a cryptographic hash, digital signature, or the like) for the file and encrypts the file using the identified member's public key. In one embodiment, vault server 200 may use a SHA-2 cryptographic hash function (e.g., SHA-224, SHA-256, SHA-384, or SHA-512), RACE Integrity Primitives Evaluation Message Digest ("RIPEMD") algorithm (e.g., RIPEMD-128, RIPEMD-160, RIPEMD-256, or RIPEMD-320), Whirlpool cryptographic hash function, or other suitable cryptographic hash function to compute the reference cryptographic integrity code for the file. In some embodiments, the cryptographic integrity code generator and the file-encrypting software components may be configured to operate on the incoming file progressively, as packets or other discrete portions of the file arrive via a network stream, the packets being discarded after processing such that the entire file is never stored even in transient memory all at the same time.

Once the file has been received, encrypted, and a cryptographic integrity code generated, vault server 200 stores 428 the encrypted file in database 110, permanently discarding (not shown) any portions of unencrypted file and/or file metadata that may remain in transient storage. In one embodiment, vault server 200 sends 430 a tracking code or other tracking information to non-member device 105 via published member widget 401, e.g., by providing the tracking information for display on non-member device 105. In one embodiment, such tracking information includes a unique transaction identifier identifying the file-transfer transaction initiated at indication 413.

Member client-side secure file-transfer application 402 runs on member device 300 and periodically queries 433 vault server 200 to determine whether the member has any pending files available to download. If so, vault server 200 retrieves metadata associated with the pending file from database 110 and provides 435 the metadata to member device 300. If some or all of the metadata was encrypted (420) before being stored (423) in database 110 (e.g., because it is sensitive or secure metadata), then that portion of metadata is provided 435 in encrypted form. If some or all of the metadata was stored (423) in database 110 in unencrypted form, then that portion is provided 435 in unencrypted form.

Figure 13:
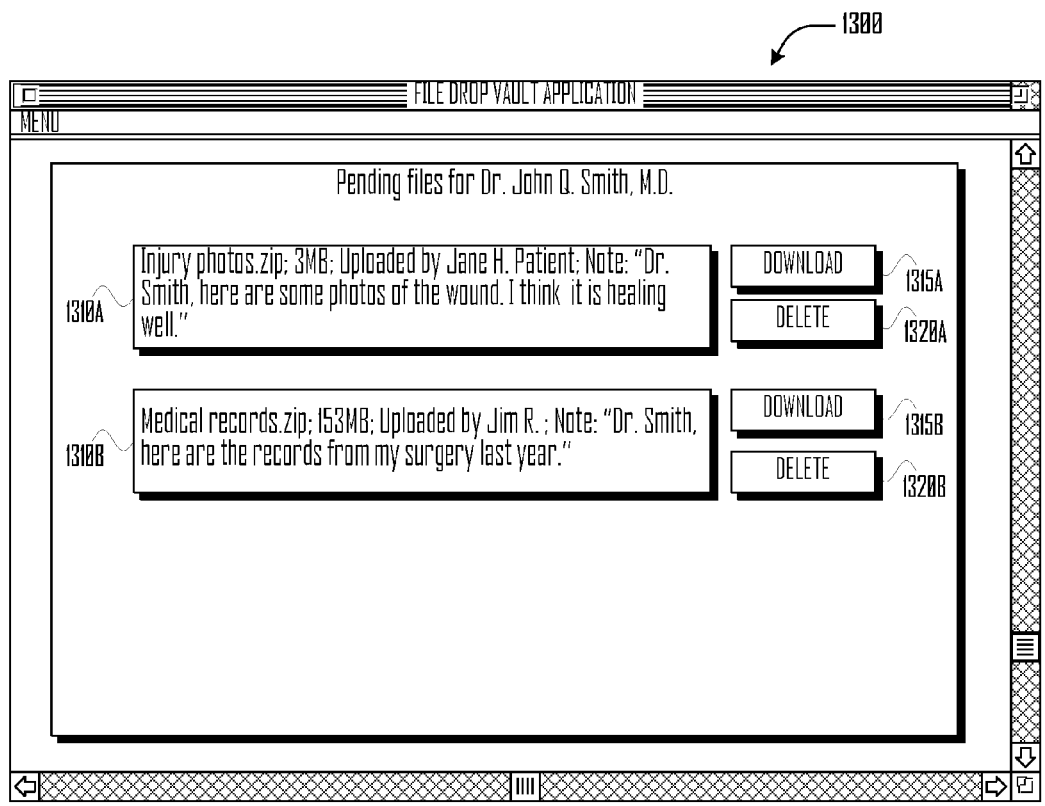
FIG. 13 illustrates a member client-side secure file-transfer application in accordance with one embodiment.

Member client-side secure file-transfer application 402, using the member's private key 365, decrypts 438 any encrypted metadata and provides information about the pending file on a display associated with member device 300. (See, e.g., FIG. 13, showing an exemplary client-side secure file-transfer application file listing.) For example, member client-side secure file-transfer application 402 may display information such as the file name, file size, information about the contents of the file, and the like. Using this display, the user operating member device 300 may determine whether to download the file. When the operator indicates to download the file, member client-side secure file-transfer application 402 requests 440 the file from vault server 200. In response, vault server 200 retrieves the encrypted file from database 110 and provides 443 the encrypted file to member client-side secure file-transfer application 402.

Using the member's private key 365, member client-side secure file-transfer application 402 decrypts the file and saves it to an indicated location, e.g. to a local file system on member device 300. Member client-side secure file-transfer application 402 computes a cryptographic integrity code (e.g., a cryptographic hash, digital signature, or the like) of the decrypted file (using the same or a similar cryptographic integrity code function or process used by vault server 200 to compute 420 the reference cryptographic integrity code of the file, as uploaded (418) by non-member device 105).

Member client-side secure file-transfer application 402 sends 450 the computed cryptographic integrity code to vault server 200, which verifies 453 it against the previously computed (425) and stored (428) reference cryptographic integrity code in database 110. When the two cryptographic integrity codes match, it can be verified that the file received (443) and decrypted (445) by member client-side secure file-transfer application 402 is identical to the file uploaded (418) by non-member device 105.

In the illustrated sequence of communications, vault server 200 verifies that the two cryptographic integrity codes match and stores 458 in database 110 the uploaded cryptographic integrity code along with associated transaction information (e.g., the current time, the IP address of the member client-side secure file-transfer application 402, and the like), such that the member's receipt of the unaltered file can subsequently be verified or audited.

Once vault server 200 has verified that member client-side secure file-transfer application 402 has successfully downloaded and decrypted the file, in one embodiment, vault server 200 permanently deletes 460 the file from database 110.

At some point, non-member device 105 may request 463 delivery confirmation from vault server 200 (e.g., using tracking information 430). In response, using the stored (458) transaction information, vault server 200 can determine that member client-side secure file-transfer application 402 downloaded and successfully decrypted a file (or files) having particular metadata at a particular time, and confirm 465 successful file transfer.

Figure 5:
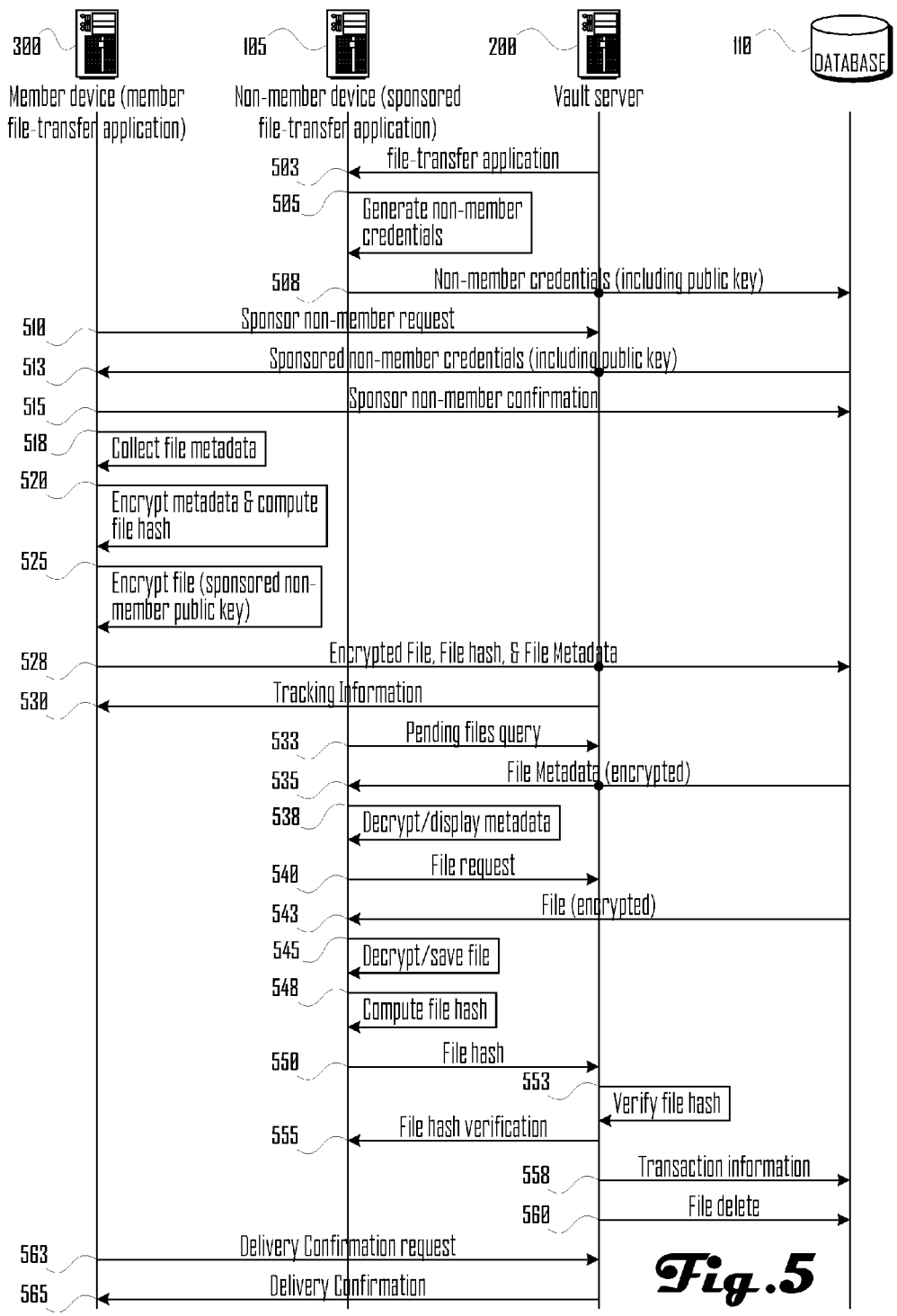

FIG. 5 illustrates an exemplary series of communications between non-member device 105, member device 300, vault server 200, and database 110, in accordance with one embodiment. The illustrated series of communications shows an exemplary scenario in which member device 300 sponsors non-member device 105 and verifiably uploads a file from member device 300 to non-member device 105 via vault server 200.

Beginning the illustrated sequence of operations, non-member device 105 downloads a client-side secure file-transfer application from vault server 200. In one embodiment, the client-side secure file-transfer application initially operates in a non-member mode with restricted capabilities (e.g., in one embodiment, client-side secure file-transfer application may only be used to upload filed to members). Executing the downloaded client-side secure file-transfer application, non-member device 105 generates 505 non-member credentials, including a non-member identifier and a public/private key pair. Non-member device 105 sends 508 the non-member credentials (excluding the non-member private key) to vault server 200, which stores the non-member credentials (excluding the non-member private key) in database 110.

Meanwhile, member device 300 requests 510 to sponsor a non-member associated with non-member device 105. In various embodiments, the non-member may be a client or patient of a verified-professional member associated with member device 300, and the member may have a need to verifiably provide sensitive files to the non-member. In one embodiment, a "sponsored member" may receive files via vault server 200 from the sponsoring member, but not from other members or from non-members.

Vault server 200 retrieves the non-member credentials from database 110 and sends 513 the non-member credentials to member device 300. Member device 300 confirms that the non-member credentials correspond to the non-member the member wishes to sponsor, and confirms 515 sponsorship of the non-member to vault server 200, which updates appropriate status records in database 110 (not shown). In one embodiment, the non-member's client-side secure file-transfer application is thereby updated to a "sponsored" mode, in which the sponsoring member will be responsible for the costs, if any, of receiving messages from the sponsored non-member.

Member device 300, executing member client-side secure file-transfer application, begins the process of upload a file for retrieval by the sponsored non-member by requesting 513 a public key for the sponsored non-member. In response, vault server 200 retrieves the requested key from database 110 and sends 515 it to member device 300.

Member device 300 identifies a file to upload for the sponsored non-member and collects 518 metadata associated with the file (e.g., information related to the contents of the file, a message to accompany the file, and the like). In one embodiment, some or all such member-provided metadata may be considered "secure metadata," as discussed below. In some embodiments, member device 300 may also automatically determine metadata corresponding to the file upload request, such as an identifier corresponding to the intended sponsored non-member-recipient of the file, the time of the request, the size of the file, the Internet Protocol ("IP") address of the member device 300, and the like.

Member device 300 encrypts 520 at least a portion of the file metadata using the sponsored non-member's public key and computes 520 a cryptographic integrity code (e.g., a cryptographic hash, digital signature, or the like) of the file. In one embodiment, member device 300 may use a SHA-2 cryptographic hash function or other suitable cryptographic hash function to compute the cryptographic integrity code of the file. In some embodiments, member device 300 may encrypt only "secure" or sensitive metadata that may have been provided by the member, leaving non-secure or non-sensitive metadata (e.g., the time of the upload, IP address of the member device 300, the size of the file, and the like) unencrypted.

Having computed a cryptographic integrity code of the file, member device 300 encrypts 525 the file using the sponsored non-member's public key and sends 528 the encrypted file, the file cryptographic integrity code, and the metadata (a portion of which may be encrypted) to vault server 200 via a secure and/or encrypted communication channel for storage in database 110. In one embodiment, vault server 200 sends 530 a tracking code or other tracking information to member device 300.

Non-member device 105, executing sponsored non-member client-side secure file-transfer application, periodically queries 533 vault server 200 to determine whether the sponsored non-member has any pending files available to download. If so, vault server 200 retrieves metadata associated with the pending file from database 110 and provides 535 the metadata via a secure and/or encrypted communication channel to non-member device 105. If some or all of the metadata was encrypted (520) before being send to and stored in (528) database 110 (e.g., because it is sensitive or secure metadata), then that portion of metadata is provided 535 in encrypted form. If some or all of the metadata was stored (528) in database 110 in unencrypted form, then that portion is provided 535 in unencrypted form.

Non-member device 105, using the sponsored non-member's private key, decrypts 538 any encrypted metadata and provides information about the pending file on a display associated with non-member device 105. For example, non-member device 105 may display information such as the file name, file size, information about the contents of the file, and the like. Using this display, the non-member operating non-member device 105 may determine whether to download the file. When the non-member indicates to download the file, non-member device 105 requests 540 the file from vault server 200. In response, vault server 200 retrieves the encrypted file from database 110 and provides 543 the encrypted file to non-member device 105.

Using the sponsored non-member's private key, non-member device 105 decrypts the file and saves it to an indicated location, e.g. to a local file system on non-member device 105. Non-member device 105 computes a file cryptographic integrity code of the decrypted file (with the same cryptographic integrity code function used by member device 300 to compute (520) the reference cryptographic integrity code of the original file).

Non-member device 105 sends 550 the computed cryptographic integrity code to vault server 200, which verifies 553 it against the previously computed (520) and stored (528) reference cryptographic integrity code in database 110. When the two cryptographic integrity codes match, it can be verified that the file received (543) and decrypted (545) by non-member device 105 is identical to the file uploaded (528) by member device 300.

In the illustrated sequence of communications, vault server 200 stores 558 in database 110 the uploaded cryptographic integrity code along with associated transaction information (e.g., the current time, the IP address of the non-member device 105, and the like), such that the sponsored non-member's receipt of the unaltered file can subsequently be verified.

Once vault server 200 has verified that non-member device 105 has successfully downloaded and decrypted the file, in one embodiment, vault server 200 permanently deletes 560 the file from database 110.

At some point, member device 300 may request 563 delivery confirmation from vault server 200 (e.g., using tracking information 530). In response, using the stored (558) transaction information, vault server 200 can determine that non-member device 105 downloaded and successfully decrypted a file having particular metadata at a particular time, and confirm 565 successful file transfer.

In other embodiments, a similar sequence of communications (starting with requesting 513 a public key for a receiving member) may arise when member device 300 uploads a file for another member (not shown), and/or when a non-member (with a client-side secure file-transfer application operating in "send-only" mode) sends a file to a member device 300.

Figure 6:
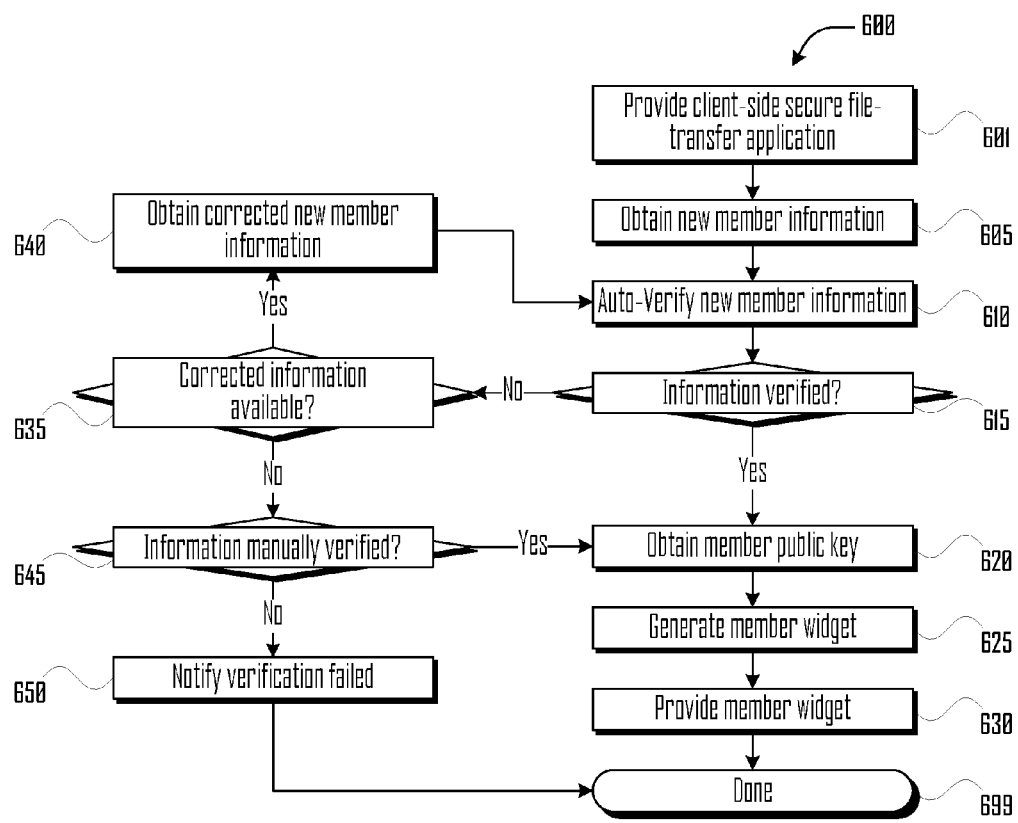
FIG. 6 illustrates a new member routine in accordance with one embodiment.

FIG. 6 illustrates a new member routine 600, such as may be performed by vault server 200 in accordance with one embodiment. In block 601, routine 600 provides a client-side secure file-transfer application to a prospective new member. For example, in one embodiment, the prospective new member may download the client-side secure file-transfer application from vault server 200 or from a data store associated with vault server 200. In some embodiments, the client-side secure file-transfer application may initially be provided in a non-member, restricted mode.

In block 605, routine 600 obtains member information for a new member. In one embodiment, the new member information may be obtained via the client-side secure file-transfer application. In other embodiments, the new member information may be obtained via a web page or other on- or off-line data-collecting interface. In many embodiments, the provided member information may include member contact information or other identity information associated with the new member, as well as professional credentials, such as a professional license number (e.g., an attorney's bar number, a CPA's license number, a physician's license number), professional firm or entity identifier (e.g., a law firm identifier, a hospital identifier, a clinical practice identifier, and the like), and the like. In one embodiment, the new-member information may include a certified copy of a professional license and/or a government-issued identification document (e.g., a driver's license, passport, and the like) including a photographic likeness of the new member.

In block 610, routine 600 attempts to automatically verify the new member information. In some embodiments, verifying the new member information may be desirable so that non-members can be confident that a verified member, to whom the non-member may wish to send sensitive files, actually is who the verified member claims to be and actually has the professional credentials that the verified member claims to have. For example, in one embodiment, routine 600 may verify the new member's purported professional license number according to an online-accessible data store of professional licensing information, comparing the member-provided contact information with that obtained from the professional licensing data store. In some embodiments, vault server 200 may automatically search a public or private data store to determine whether an identified professional firm actually exists, and if so, whether the firm actually employs a professional corresponding to provided new-member identifying information.

In decision block 615, routine 600 determines whether the new member information was successfully verified. If the new member information was not successfully verified, then in decision block 635, routine 600 determines whether the supplied new member information included a correctable error (e.g., a mis-typed professional license number, address, name, or the like). If corrected new member information is available, then in block 640, routine 600 obtains the corrected new member information and proceeds to re-verify the corrected information in block 610.

If no corrected information is determined in block 635 to be available, then in some embodiments, if new member information cannot be automatically verified, manual verification may be employed. For example, in one embodiment, manual verification may include a phone call to the professional's business phone number of record (as recorded by a licensing agency); a video call, video chat, and/or video conference with the professional to verify his or her photo likeness; and the like.

In block 645, routine 600 determines whether the new member information can be manually verified. If so, then routine 600 proceeds to process the new member in block 620, discussed below. If the new member information cannot be manually verified, then in block 650, routine 600 notifies the prospective new member that the member information cannot be verified, and routine 600 ends in block 699. In some embodiments, routine 600 may include an option (not shown) to allow the new member to be temporarily or permanently active as an un-verified member. In such embodiments, un-verified members may not have access to all functionality that verified members have access to.

Once new member information has been verified, in block 620, routine 600 updates the client-side secure file-transfer application to "member" mode (which may provide functionality to securely receive files from non-members, as discussed herein), obtains a public key (e.g., 360) for the new member, and stores it (e.g., in database 110) for subsequent use. In some embodiments, routine 600 may obtain the public key from the new member, who may have generated a public/private key pair via the client-side secure file-transfer application downloaded in block 601. In other embodiments, routine 600 may generate a public/private key pair for the new member, sending the pair to the new member and storing the public key (e.g., in database 110) for subsequent use. In some embodiments, routine 600 may also obtain a public key certificate (possibly provided by vault server 200 acting as a certificate authority) or other token identifying the new member.

In block 625, routine 600 generates a member widget for the new member. In some embodiments, the member widget may comprise an "applet" or other web-upload tool that may be embedded in the member's web page, in which case routine 600 may generate and/or customize a program code template corresponding to the applet for the new member. In various embodiments, such an "applet" may comprise a Java application, an Adobe Flash document, a Microsoft Silverlight document, and the like. In one embodiment, the generated member widget includes a unique identifier corresponding to the member. In some embodiments, the member widget may be customized in appearance and/or "branded" according to the new member's instructions.

In block 630, routine 600 provides to the new member the member widget and/or an identifier corresponding to the member widget. For example, in one embodiment, routine 600 may send a Uniform Resource Locator ("URL") corresponding to the generated member widget.

In some embodiments, new member routine 600 may also provide for collecting payment from the new member (not shown). Routine 600 ends in block 699.

Figure 7:
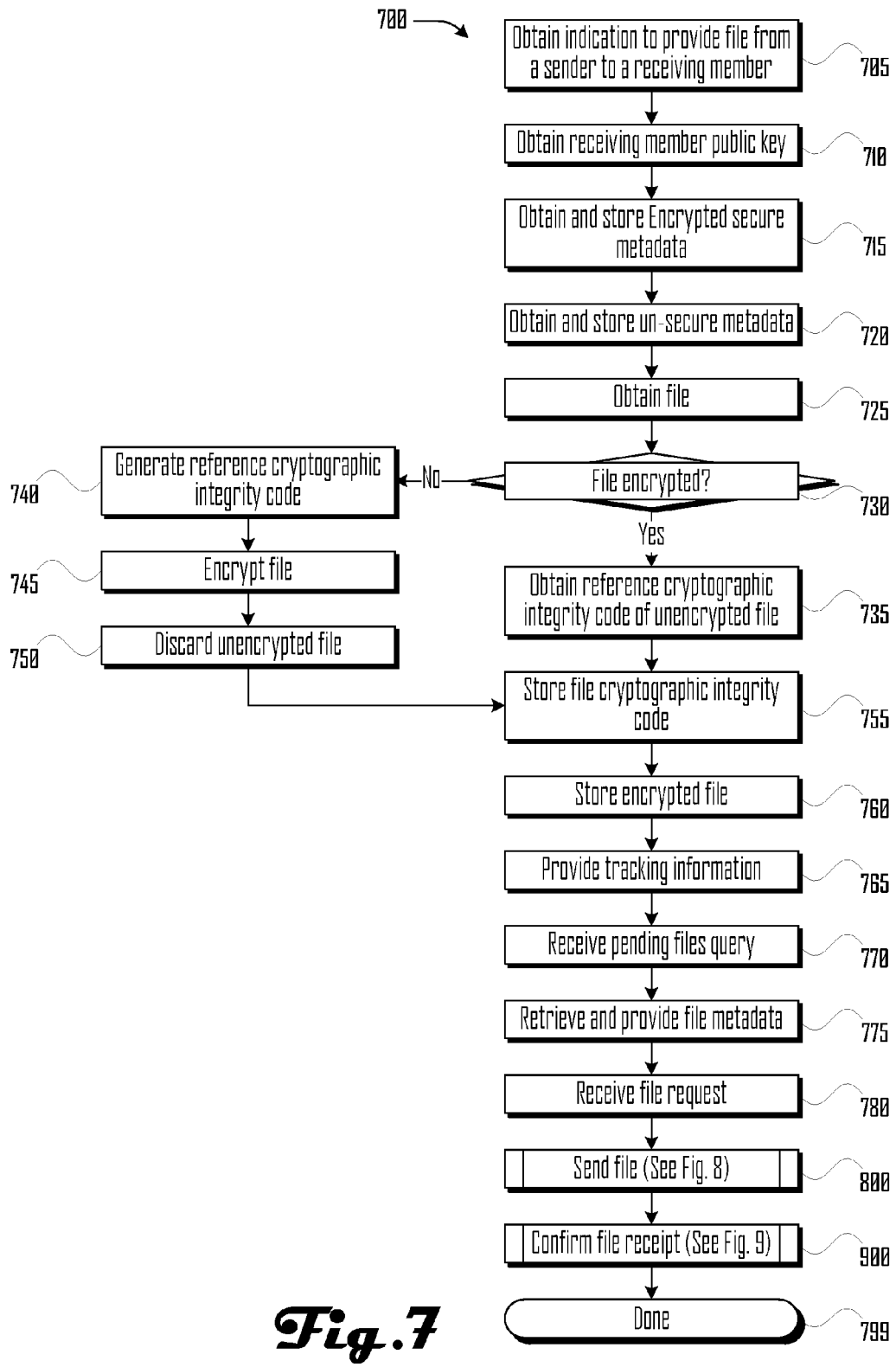
FIG. 7 illustrates a file drop vault routine in accordance with one embodiment.

FIG. 7 illustrates a file drop vault routine 700, such as may be performed by vault server 200 in accordance with one embodiment. For clarity's sake, routine 700 is described in terms of a single transaction involving a single file. However, in many cases, multiple files may be involved in a single file drop vault transaction without departing from the scope of the descriptions provided herein.

In block 705, routine 700 obtains an indication to provide a file from a sender to an identified receiving member. In the case in which the sender is a non-member, the indication may be received via the receiving member's member widget, which may be embedded on one of the receiving member's web pages. In other embodiments, when the sender is a non-member, the indication may be received via a client-side secure file-transfer application operating in restricted or "send-only" mode for the non-member. In the case in which the sender is another member or a sponsored member (sponsored by the receiving member), the indication may be obtained via a client-side secure file-transfer application on the sender's device. In some embodiments, the receiving member may be a sponsored member (sponsored by the sending member), in which case, the indication may be received from the sending member's client-side secure file-transfer application.

In block 710, routine 700 obtains a public key (e.g. public key 360) associated with the identified receiving member. For example, in one embodiment, routine 700 may retrieve the receiving member's public key from database 110.

In block 715, routine 700 obtains and stores in database 110 encrypted "secure" or sensitive metadata associated with the file. In some embodiments, metadata may be considered "secure" or sensitive if it relates to the contents of the file and/or to information provided by the sender for the receiving member. In some embodiments, routine 700 may receive the "secure" or sensitive metadata in clear form (e.g., when provided via the receiving member's embedded member widget) and proceed to encrypt the "secure" or sensitive metadata before storing it in database 110. In other embodiments, routine 700 may receive the "secure" or sensitive metadata in encrypted form (e.g. from a client-side secure file-transfer application on the sender's device).

In block 720, routine 700 obtains (e.g., from the receiving member's embedded member widget or from the sender's client-side secure file-transfer application) and stores in database 110 "un-secure" or non-sensitive metadata associated with the file and/or the indication to provide the file to the receiving member. For example, in one embodiment, metadata that can be automatically determined, such as the time, the IP address of the sender, the size of the file, and the like, may be considered non-sensitive and stored in clear form.

In block 725, routine 700 obtains the file destined for the receiving member. In some embodiments, routine 700 may receive the file in clear form via a secure communications channel (e.g., when provided via the receiving member's embedded member widget). In other embodiments, routine 700 may receive the file in encrypted form (e.g., when provided via the sending member's or sending sponsored-member's client-side secure file-transfer application). In one embodiment, sensitive metadata is always encrypted in transport and is never persistently stored in clear form.

In decision block 730, routine 700 determines whether the file is already in encrypted form. If the file is already encrypted, then in block 735, routine 700 obtains a cryptographic integrity code of the unencrypted file (e.g., from the sending member's or sending sponsored-member's client-side secure file-transfer application).

If the file is in clear form, then in block 740, routine 700 computes a cryptographic integrity code (e.g., a cryptographic hash, digital signature, or the like) of the file. In one embodiment, routine 700 may use a SHA-2 cryptographic hash function or other suitable cryptographic hash function to compute the cryptographic integrity code of the file.

In block 745, routine 700 encrypts the file using the receiving member's public key. In one embodiment, routine 700 may encrypt the file according to a public-key cryptography algorithm such as RSA, Elliptic curve cryptography ("ECC"), or other suitable algorithm. In other embodiments, routine 700 may generate a single-use key (e.g. via a cryptographically secure pseudo-random number generator) for encrypting the metadata according to the AES symmetric-key encryption standard or according to another suitable encryption standard. In such embodiments, routine 700 may then encrypt the single-use key using the receiving member's public key according to a public-key cryptography algorithm, storing the AES-encrypted metadata as well as the public-key encrypted single-use key. In one embodiment, the unencrypted single-use key is then discarded and/or purged from memory, never having been persistently stored. In one embodiment, some or all of the encryption operations performed by routine 700 may utilize encryption software conforming to the OpenPGP standard (RFC 4880), such as Pretty Good Privacy ("PGP"), GNU Privacy Guard ("GPG"), or the like. In various embodiments, "secure" metadata may be encrypted according to a similar scheme.

In block 750, routine 700 permanently discards the unencrypted file. In some embodiments, the cryptographic integrity code generating (block 740) and the file-encrypting (block 745) software components may be configured to operate on the incoming file progressively, as packets or other discrete portions of the file arrive via a network stream, the packets being progressively discarded in block 750 such that the entire file is never stored even in transient memory all at the same time.

In block 755, routine 700 stores (e.g., in database 110) the file cryptographic integrity code that was either obtained in block 735 or generated in block 740. In block 760, routine 700 stores (e.g., in database 110) the file in encrypted form. In block 765, generates a tracking code or other tracking information corresponding to the in-progress file transfer and provides the tracking code (or other tracking information) to the sender. In one embodiment, the tracking information includes a transaction code uniquely identifying the file transfer transaction initiated in block 705.

In one embodiment, client-side secure file-transfer applications periodically query vault server 200 to check for pending file transfers. In block 770, routine 700 receives such a "pending files" query from a client-side secure file-transfer application on the receiving member's (or receiving sponsored-member's) device. In response to the query, routine 700 determines that the in-progress file transfer includes a file destined for the querying member, retrieves the metadata stored in blocks 715 and/or 720, and provides the metadata to the querying client-side secure file-transfer application in the same form in which it was stored in database 110 (e.g., in encrypted form if some or all of the metadata was stored in encrypted form; in clear form if some or all of the metadata was stored in clear form).

The querying client-side secure file-transfer application, using the receiving member's private key 365, decrypts any encrypted metadata and provides information about the pending file on a display associated with the receiving member's device. (See, e.g., FIG. 13, showing an exemplary client-side secure file-transfer application file listing.) Using this display, the user operating the receiving member's device may determine whether to download the file. When the operator indicates to download the file, the querying client-side secure file-transfer application requests the file from vault server 200.

In block 780, routine 700 receives such a file request from the querying client-side secure file-transfer application. In subroutine block 800, routine 700 calls "send file" subroutine 800 (see FIG. 8, discussed below) to send the requested file to the querying client-side secure file-transfer application. In subroutine block 900, routine 700 calls "confirm file transfer" subroutine 900 (see FIG. 9, discussed below) to confirm to the sender whether the receiving member correctly received the file. Routine 700 ends in block 799.

Figure 8:
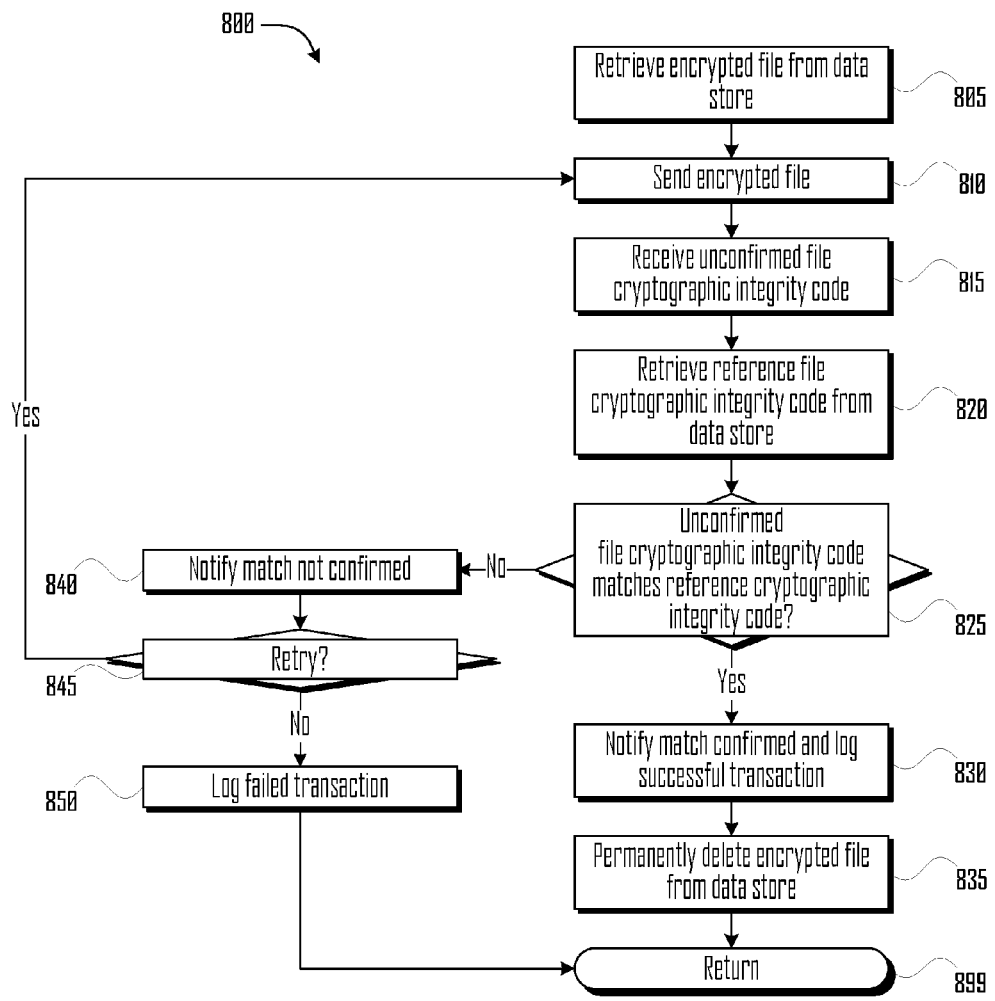
FIG. 8 illustrates a subroutine for sending a requested file in accordance with one embodiment.

FIG. 8 illustrates a subroutine 800 for sending a requested file to a receiving member's client-side secure file-transfer application in accordance with one embodiment. In block 805, subroutine 800 retrieves the requested file in encrypted form from database 110. In block 810, subroutine 800 sends the encrypted file to the receiving member's client-side secure file-transfer application, which decrypts the file using the receiving member's private key, computes a cryptographic integrity code of the decrypted file, and sends the unconfirmed cryptographic integrity code to vault server 200 to be confirmed.

In block 815, subroutine 800 receives the unconfirmed cryptographic integrity code from the receiving member's client-side secure file-transfer application. In some embodiments, subroutine 800 may also store the unconfirmed cryptographic integrity code in database 110 for subsequent confirmation/verification/auditing purposes. In block 820, subroutine 800 retrieves from database 110 the stored reference cryptographic integrity code that was originally computed for the unencrypted file as sent by the sender (see blocks 735 and 740 of FIG. 7, discussed above).

In decision block 825, subroutine 800 determines whether the unconfirmed cryptographic integrity code matches the reference cryptographic integrity code. If the two cryptographic integrity codes match, then the receiving member is confirmed to have successfully received the file precisely as it was sent by the sender, and in block 830, subroutine 800 logs successful transaction information (e.g., to database 110) and notifies the receiving member's client-side secure file-transfer application of its success in receiving and decrypting a correct copy of the file. In some embodiments, in block 835, subroutine 800 permanently deletes the encrypted file from database 110.

However, if in block 825, subroutine 800 determines that the two cryptographic integrity codes do not match, then the receiving member has failed to receive and decrypt a correct copy of the file precisely as it was sent by the sender, and in block 840, subroutine 800 stores an indication of this failure and notifies the receiving member's client-side secure file-transfer application.

In some cases, an error may have occurred in transmission or decoding, and re-sending the encrypted file may alleviate the error. In decision block 845, subroutine 800 determines whether to re-attempt to send the encrypted file to the receiving member's client-side secure file-transfer application. If the file transfer is to be re-attempted, then in block 810, subroutine 800 attempts to send the encrypted file again. If the file transfer is not to be re-attempted (e.g., because the transfer has failed multiple times or for other reasons), then in block 850, subroutine 800 logs the failed file transfer attempt.

In various embodiments, logging file-transfer successes and failures may include storing in database 110 the cryptographic integrity code received from the receiving member's client-side secure file-transfer application, as well as associated tracking information (e.g., the current time, the IP address of the receiving member's client-side secure file-transfer application, and the like), such that the receiving member's successful or unsuccessful receipt of the unaltered file can subsequently be verified.

Subroutine 800 ends in block 899, returning to the caller.

Figure 9:
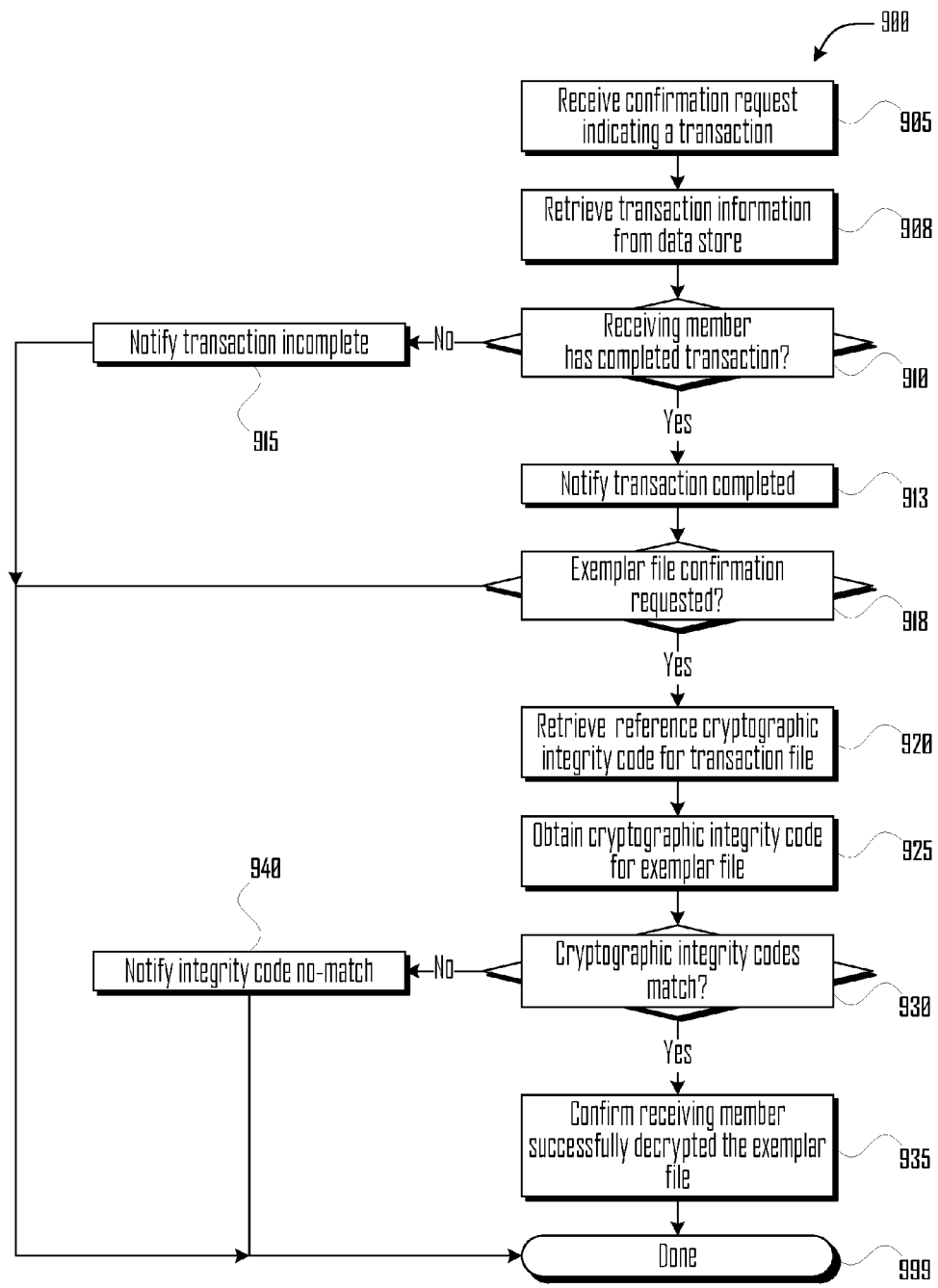
FIG. 9 illustrates a subroutine for confirming the successful transfer of a file, in accordance with one embodiment.

FIG. 9 illustrates a subroutine 900 for verifying or auditing the successful transfer of a file, in accordance with one embodiment. For clarity's sake, subroutine 900 is described in terms of a single transaction involving a single file. However, in many cases, multiple files may be involved in a single file drop vault transaction without departing from the scope of the descriptions provided herein.

In block 905, subroutine 900 receives a request (typically from the sender of a file) to verify that the intended receiving member successfully completed a file-transfer transaction indicated by the request. In block 908, subroutine 900 retrieves transaction information (if any) associated with the indicated file-transfer transaction that was previously logged to database 110.

Consulting this transaction information, in decision block 910, subroutine 900 determines whether the receiving member has completed the file transfer transaction by successfully retrieving the file or files involved in the transaction. If the receiving member has not successfully retrieved the file or files (e.g., because the receiving member's client-side secure file-transfer application may not yet have queried for pending files, or because the receiving member's client-side secure file-transfer application has identified the file as pending, but the receiving member has declined or failed to retrieve the file), then in block 915, subroutine 900 notifies the sender that the file transfer transaction remains incomplete, and subroutine 900 ends in block 999. In some embodiments, subroutine 900 may further notify the sender if the receiving member discarded, canceled, or failed at the pending file transfer. In some embodiments, details of the history of the transaction (e.g., upload time, intended recipient notification time, download time, the time of an unsuccessful download and associated error messages, transaction rejection or deletion time, or the like) may also be provided.

If the receiving member has completed the file transfer transaction, then in block 918, subroutine 900 determines whether the confirmation requestor has requested to confirm whether a particular exemplar file (or files) was included in the successfully completed transaction. If not, then subroutine 900 ends in block 999, returning to the caller.

On the other hand, if the confirmation requestor has requested to confirm whether a particular exemplar file was included in the successfully completed transaction, then in block 920, subroutine 900 retrieves from database 110 the reference cryptographic integrity code(s) of the file(s) involved in the transaction, as computed at the time the file (or files) was provided for upload to vault server 200 (see blocks 735 and 740 in FIG. 7, discussed above).

In block 925, subroutine 900 obtains an exemplar cryptographic integrity code for the exemplar file that the requestor wishes to confirm as having been part of the successfully completed transaction. In some embodiments, the confirmation requestor may provide the exemplar cryptographic integrity code. In other embodiments, the confirmation requestor may provide the exemplar file, and subroutine 900 may determine the exemplar cryptographic integrity code based on the exemplar file.

In decision block 930, subroutine 900 determines whether the reference and exemplar cryptographic integrity codes match. If the reference and exemplar cryptographic integrity codes match, then in block 935, subroutine 900 notifies the sender that the receiving member is confirmed to have successfully received a correct copy of the exemplar file. If the two cryptographic integrity codes do not match, then in block 940, subroutine 900 notifies the sender that the integrity codes did not match, which indicates that the receiving member failed to receive a correct copy of the exemplar file in the particular transaction at issue. (Although in some cases, a match failure may alternatively indicate that the exemplar file submitted for comparison was not the file delivered in the indicated transaction, leaving open the possibility that the exemplar file was correctly received in a different transaction.)

In either case, in some embodiments, subroutine 900 may also provide the sender with additional transactional metadata associated with the receiving member's successful and/or unsuccessful attempts to retrieve the file (e.g., the time or times at which the receiving member attempted to retrieve the file, the IP address of the receiving member's client-side secure file-transfer application, and the like). In alternative embodiments, database 110 may not store the cryptographic integrity code that was computed for the file that was downloaded by the receiving member's client-side secure file-transfer application, storing only the reference cryptographic integrity code of the original file, as computed at the time the file was provided for upload to vault server 200. In such embodiments, database 110 may store an indication that the receiving member did or did not confirm successful download of the file at a given time, and decision block 930 may involve retrieving the stored indication, rather than comparing two cryptographic integrity codes. Subroutine 900 ends in block 999.

Figure 10:
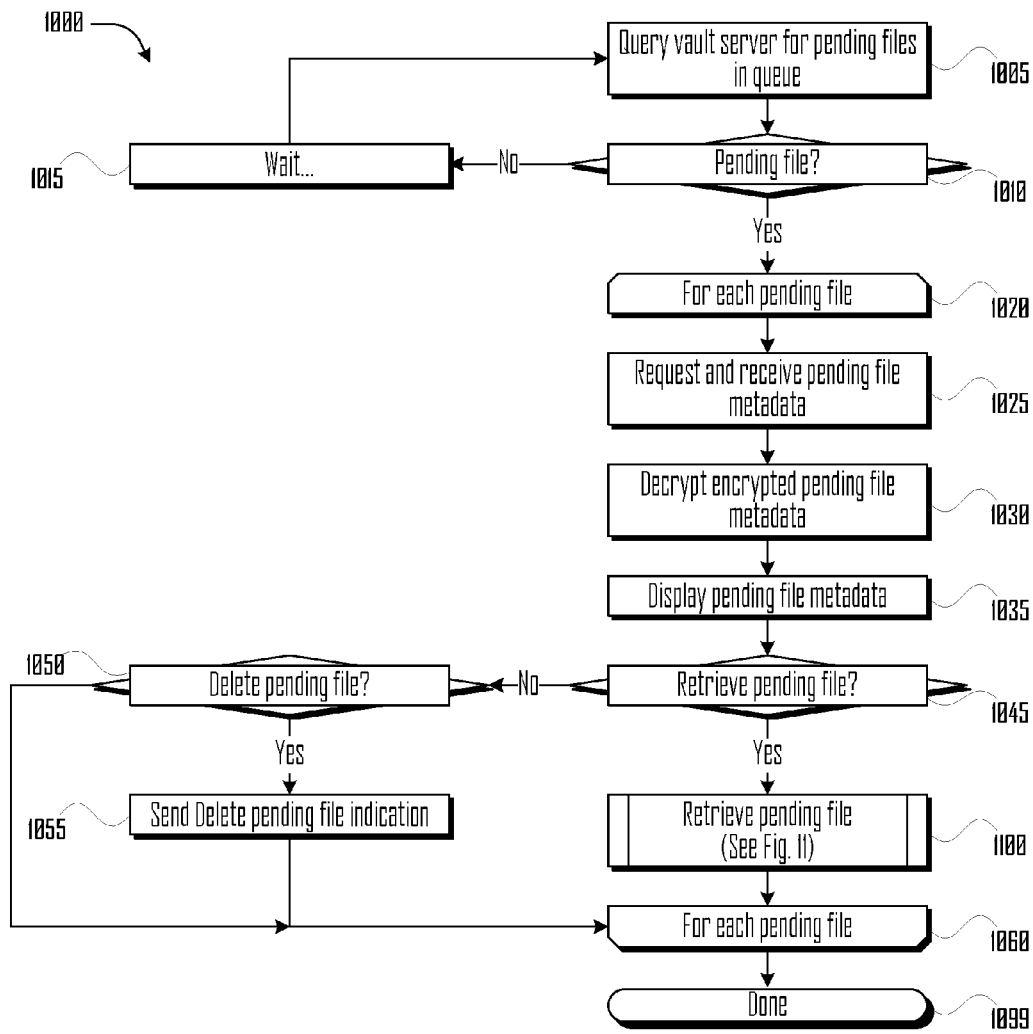
FIG. 10 illustrates a file-receiving routine in accordance with one embodiment.

FIG. 10 illustrates a file-receiving routine 1000, such as may be performed by a receiving member's client-side secure file-transfer application on a receiving member's device (e.g., member device 300) in accordance with one embodiment. For clarity's sake, routine 1000 is described in terms of a single transaction involving a single file. However, in many cases, multiple files may be involved in a single file drop vault transaction without departing from the scope of the descriptions provided herein.

In block 1005, routine 1000 queries vault server 200 whether any pending files are queued for download by the receiving member's client-side secure file-transfer application. In decision block 1010, routine 1000 receives a response from vault server 200 and determines whether a file is indicated to be pending. If no file is currently pending, then in block 1015, routine 1000 waits for a period of time before querying vault server 200 again.

If in decision block 1020, routine 1000 determines that one or more pending files are queued for download by the receiving member's client-side secure file-transfer application, then routine 1000 processes each pending file in turn beginning in starting loop block 1020. In block 1025, routine 1000 requests and receives from vault server 200 metadata associated with the current pending file. In various embodiments, the metadata thus received may include one or both of encrypted metadata and clear-form metadata.

In block 1030, routine 1000 decrypts, using the receiving member's private key (e.g., private key 365), any encrypted metadata that was received. In block 1035, routine 1000 displays some or all of the metadata (including decrypted metadata, if any) on a display associated with member device 300. (See FIG. 13, discussed below.)

In decision block 1045, routine 1000 determines whether it has received an indication to retrieve the current pending file. If the operator of member device 300 has so indicated, then routine 1000 calls subroutine 1100 (see FIG. 11, discussed below) to retrieve the current pending file. In ending loop block 1060, routine 1000 returns to block 1020 to process the next pending file (if any).

However, if in block 1045, routine 1000 determines it has received an indication to not retrieve the pending file, then routine 1000 determines in decision block 1050 whether the operator of member device 300 has indicated to cancel the current pending file transfer and/or delete the current pending file. If the operator of member device 300 has so indicated, then in block 1055, routine 1000 sends to vault server 200 an indication to cancel the current pending file transfer and/or delete the current pending file. If the operator of member device 300 has not indicated to cancel the current pending file transfer and/or delete the current pending file, then in ending loop block 1060, routine 1000 returns to block 1020 to process the next pending file (if any).

Routine 1000 ends in block 1099.

Figure 11:
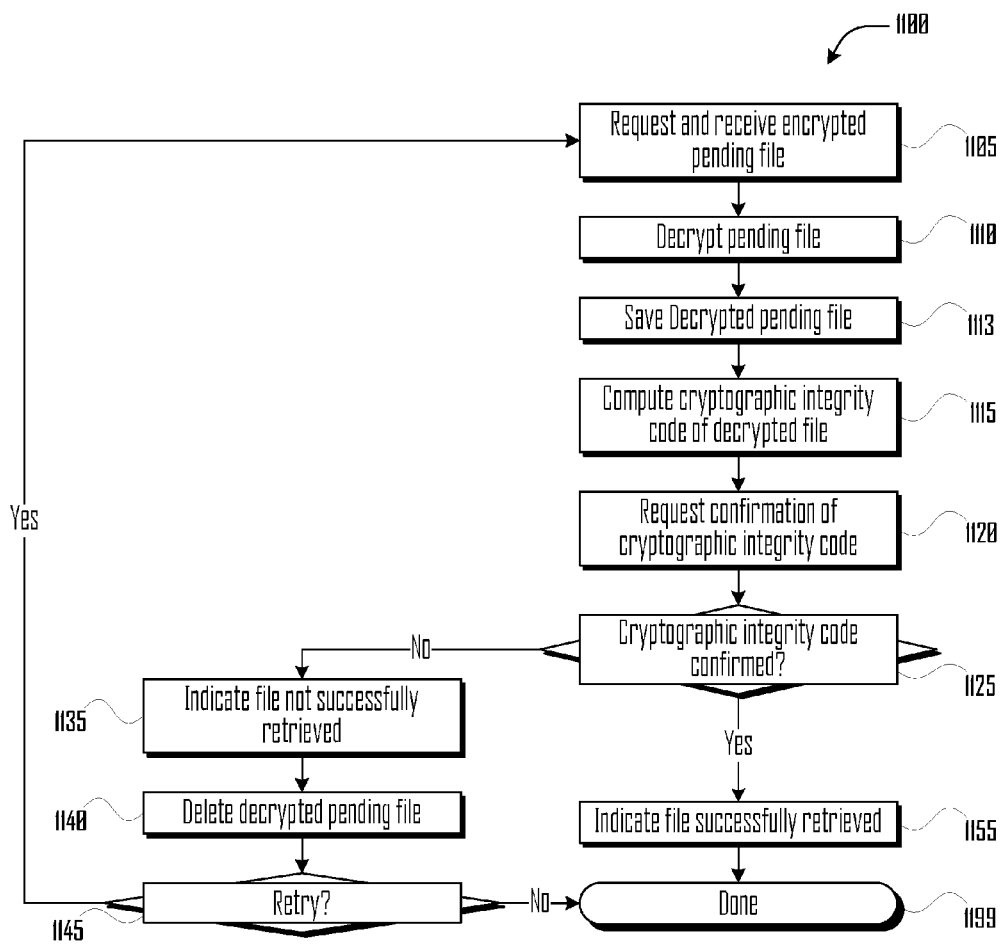
FIG. 11 illustrates a subroutine for retrieving a pending file in accordance with one embodiment.

FIG. 11 illustrates a subroutine 1100 for retrieving a pending file by a receiving member's client-side secure file-transfer application in accordance with one embodiment. For clarity's sake, subroutine 1100 is described in terms of a single transaction involving a single file. However, in many cases, multiple files may be involved in a single file drop vault transaction without departing from the scope of the descriptions provided herein.

In block 1105, subroutine 1100 requests and receives the encrypted pending file from vault server 200. In block 1110, subroutine 1100 decrypts the received pending file using the receiving member's private key (e.g., private key 365). In block 1113, subroutine 1100 stores the decrypted file, e.g. to a local file system.

In block 1115, subroutine 1100 computes a cryptographic integrity code (e.g., a cryptographic hash, digital signature, or the like) of the decrypted file as stored in block 1113. In one embodiment, subroutine 1100 may use a SHA-2 cryptographic hash function or other suitable cryptographic hash function to compute the cryptographic integrity code of the decrypted file.

In block 1120, subroutine 1100 requests that vault server 200 confirm that the locally-computed cryptographic integrity code matches the reference cryptographic integrity code that was originally computed for the unencrypted file as sent by the sender (see blocks 735 and 740 of FIG. 7, discussed above).

In decision block 1125, subroutine 1100 receives a response from vault server 200 and determines whether the locally computed cryptographic integrity code matches the reference cryptographic integrity code. If so, then in block 1155, subroutine 1100 indicates successful file transfer before ending in block 1199.

However, if in block 1125, subroutine 1100 determines that locally-computed cryptographic integrity code fails to match the reference cryptographic integrity code, then in block 1135, subroutine 1100 indicates that the pending file was not correctly retrieved and/or decrypted and deletes the decrypted file in block 1140.

In decision block 1145, subroutine 1100 determines whether to re-attempt to retrieve the pending file. For example, in one embodiment, subroutine 1100 may prompt the operator of member device 300 whether to re-attempt. In other embodiments, subroutine 1100 may automatically determine to re-attempt one or more times. If no re-attempt is to be made, then subroutine 1100 ends in block 1199. Otherwise, subroutine 1100 returns to block 1105 to re-attempt the file download.

FIG. 12 illustrates an exemplary member widget 1205 or web-upload tool embedded in a member's web page in accordance with one embodiment. Embedded member widget 1205 includes an indication 1210 that the member is a verified professional, as well as a control 1215 for providing a file for secure and verifiable or auditable transfer to the member. In other embodiments, member widget 1205 may include more, fewer, and/or different information displays and controls.

FIG. 13 illustrates an exemplary member client-side secure file-transfer application 1300 in accordance with one embodiment. Member client-side secure file-transfer application 1300 is displaying a list of pending files 1310A-B queued for retrieval by member client-side secure file-transfer application 1300. Each entry in the pending file list includes controls for downloading 1315A-B and deleting 1320A-B a pending file. Each entry also includes metadata about the file including a file name, file size, identity of the sender, and a message from the sender. Other embodiments may include more, fewer, and/or different controls and may display more, less, and/or different metadata for each pending file.

One illustrative commercial embodiment of the systems and methods disclosed herein comprises several components:
- a member widget or web-upload tool embedded on a member's website to upload files to that member;
- a secure file transfer service server system (corresponding to database 110, vault server 200, and various routines and subroutines that persists data, notifies the recipients, validates members, accepts uploaded files, and the like); and
- a client-side secure file-transfer application, for operating on a member or non-member device for sending files, receiving files (in the case of member or sponsored-member operated applications), and handling communications with the secure file transfer service server system.

The illustrative commercial embodiment requires a prospective professional member to upload a certified copy of his or her professional license and a government-issued photo-identification document to verify the member's status as a professional.

In the illustrative commercial embodiment, the client-side secure file-transfer application also uses the "Bouncy Castle Crypto APIs" (provided by The Legion Of The Bouncy Castle of http://www.bouncycastle.org) for performing various key-generation, file encryption/decryption, and cryptographic integrity code functions. When first installed on a client device, the client-side secure file-transfer application runs in restricted non-member or send-only mode. It can be upgraded to "Member" mode or "Sponsored" mode. To upgrade to "Member" mode, the user sends documentation and information to the secure file transfer service server using the client-side secure file-transfer application in send-only mode.

For "Sponsored" mode, a Member communicates with the to-be-sponsored party (e.g., client, patient, staff member, co-workers, professional colleague) and has that party send (in send-only mode) documentation indicating that they control a particular instance of the client-side secure file-transfer application and wish to be sponsored by the sponsoring Member. Then, the sponsoring Member uses the Member's own client-side secure file-transfer application to notify the secure file transfer service server that he or she chooses to sponsor that particular instance. The secure file transfer service server system tracks the status of all installed instances of the client-side secure file-transfer application and their respective modes (send-only, sponsored, or member). The client-side secure file-transfer application and the key generation components are installed on the user's device to receive files.

In the illustrative commercial embodiment, the client-side secure file-transfer application on a user's device generates keys on the user's device and only shares the user's public key with the secure file transfer service server system. Anyone (in a jurisdiction to which advanced cryptography tools can be legally provided) can install the client-side secure file-transfer application and use it in send-only mode to make sending faster, more secure, and to gain other benefits (history, favorites, and the like) over using a receiving member's member widget.

The illustrative commercial embodiment also optionally requires an authorization code to send a file to a member. Members who choose this option can specify an authorization code that can be used one-time, an unlimited number of times, for a certain number of times, or that can be used only according to a specified set of conditions or restrictions. For members who use the authorization code option, the secure file transfer service server system will only accept uploads when the sender includes an appropriate authorization code. The authorization code option may minimize the chance that a spammer could take advantage of the system.

Although specific embodiments have been illustrated and described herein, a whole variety of alternate and/or equivalent implementations may be substituted for the specific embodiments shown and described without departing from the scope of the present disclosure. For example, in many cases, two or more files may be provided for transfer to a member as part of a single transaction. This application is intended to cover any adaptations or variations of the embodiments discussed herein.

The invention claimed is:

1. A computer-implemented method for providing a secure file-exchange service, the method comprising:
    obtaining, by a file-exchange server from a remote member device, new member information including identity information and a professional credential associated with a new member;
    verifying, by said file-exchange server according to said identity information, that said new member has a personal identity as indicated by said identity information, and that said new member has a professional designation as indicated by said professional credential;
    when said new member's personal identity and professional designation have been verified, designating said new member as a verified-professional member and obtaining, by said file-exchange server, a member public key of a public/private key pair for said verified-professional member;
    generating, by said file-exchange server, a member widget indicating said verified-professional member's status as a verified professional and being configured to accept files submitted for secure transfer to said verified-professional member;
    providing, by said file-exchange server, said member widget for publication by said new member;
    receiving an indication, by said file-exchange server via said published member widget, to provide a file from a remote sender device to said verified-professional member;
    obtaining, by said file-exchange server from said remote sender device via said published member widget, metadata associated with said file;
    obtaining, by said file-exchange server, a reference cryptographic integrity code derived from said file;
    obtaining, by said file-exchange server from said remote sender device via said published member widget, an encrypted copy of said file, said encrypted copy being encrypted with said member public key;
    storing said metadata, said reference cryptographic integrity code, and said encrypted copy in a non-transient data store;
    receiving, from said remote member device, a request for said file; and in response to said request:
        retrieving said encrypted copy from said data store;
        sending said encrypted copy to said remote member device for decryption, according to said private key, into an unconfirmed unencrypted file;
        receiving, from said remote member device, an unconfirmed cryptographic integrity code derived from said unconfirmed unencrypted file;
        determining whether said unconfirmed cryptographic integrity code matches said reference cryptographic integrity code; and
        when said unconfirmed cryptographic integrity code is determined to match said reference cryptographic integrity code, confirming to said remote member device that said unconfirmed unencrypted file is a correct copy of said file.

2. The method of claim 1, further comprising, prior to generating said member widget, providing a client-side secure file-transfer application to said remote member device.

3. The method of claim 2, wherein said new-member information is obtained via said client-side secure file-transfer application.

4. The method of claim 1, wherein generating said member widget comprises customizing a widget template according to said new-member information.

5. The method of claim 1, further comprising, prior to generating said member widget, providing a client-side secure file-transfer application to said remote member device, said client-side secure file-transfer application being provided in a restricted non-member mode.

6. The method of claim 5, wherein designating said new member as said verified-professional member comprises updating said client-side secure file-transfer application to a member mode.

7. The method of claim 1, further comprising:
    providing a client-side secure file-transfer application to said remote sender device, said client-side secure file-transfer application being provided in a restricted mode; and
    receiving, from said remote sender device via said client-side secure file-transfer application, non-member credentials associated with a non-member with whom said remote sender device is associated.

8. The method of claim 7, further comprising:
    receiving, from said remote member device, a request to sponsor said non-member as having a professional relationship with said verified-professional member; and
    in response to receiving said request:
        providing said non-member credentials to said remote member device; and
        updating said client-side secure file-transfer application to a sponsored mode.

9. The method of claim 8, wherein updating said client-side secure file-transfer application to said sponsored mode enables said verified-professional member to securely and auditably transfer files to said non-member via said updated client-side secure file-transfer application.

10. The method of claim 1, wherein providing said member widget comprises sending program code corresponding to said member widget to said verified-professional member.

11. The method of claim 1, wherein providing said member widget comprises sending a resource identifier corresponding to said member widget to said verified-professional member.

12. The method of claim 1, further comprising, prior to receiving said request for said file:
    receiving, from said remote member device, a pending-files query; and
    in response to receiving said query, retrieving said metadata associated with said file from said data store and providing said metadata for retrieval by said remote member device.

13. The method of claim 1, further comprising,
    when said unconfirmed cryptographic integrity code is determined to match said reference cryptographic integrity code:
        storing in said data store an indication that said remote member device received said correct copy of said file.

14. The method of claim 1, further comprising permanently deleting said encrypted copy from said data store when said unconfirmed cryptographic integrity code is determined to match said reference cryptographic integrity code.

15. The method of claim 13, wherein said indication includes file transfer details comprising:
   said unconfirmed cryptographic integrity code received from said remote member device; and
   a timestamp denoting a delivery date and/or delivery time at which said unconfirmed cryptographic integrity code was determined to match said reference cryptographic integrity code.

16. The method of claim 15, further comprising:
   receiving, from said remote sender device, a confirmation request to confirm correct receipt of said file by said remote member device; and
   in response to receiving said confirmation request:
      retrieving from said data store said indication that said remote member device received said correct copy of said file; and
      providing said file transfer details to said remote sender device to confirm that said remote member device received said correct copy of said file as of said delivery date and/or delivery time.

17. A non-transient computer-readable medium having stored thereon instructions that, when executed by a processor, configure the processor to:
   obtain, from a remote member device, new-member information including identity information and a professional credential associated with a new member;
   verify, according to said identity information, that said new member has a personal identity as indicated by said identity information, and that said new member has a professional designation as indicated by said professional credential;
   when said new member's personal identity and professional designation have been verified, designate said new member as a verified-professional member and obtaining a member public key of a public/private key pair for said verified-professional member;
   generate a member widget indicating said verified-professional member's status as a verified professional and being configured to accept files submitted for secure transfer to said verified-professional member;
   provide said member widget for publication by said new member;
   receive an indication, via said published member widget, to provide a file from a remote sender device to said verified-professional member;
   obtain, from said remote sender device via said published member widget, metadata associated with said file;
   obtain a reference cryptographic integrity code derived from said file;
   obtain, from said remote sender device via said published member widget, an encrypted copy of said file, said encrypted copy being encrypted with said member public key;
   store said metadata, said reference cryptographic integrity code, and said encrypted copy in a non-transient data store;
   receive, from said remote member device, a request for said file; and
   in response to said request:
      retrieve said encrypted copy from said data store;
      send said encrypted copy to said remote member device for decryption, according to said private key, into an unconfirmed unencrypted file;
      receive, from said remote member device, an unconfirmed cryptographic integrity code derived from said unconfirmed unencrypted file;
      determine whether said unconfirmed cryptographic integrity code matches said reference cryptographic integrity code; and
      when said unconfirmed cryptographic integrity code is determined to match said reference cryptographic integrity code, confirm to said remote member device that said unconfirmed unencrypted file is a correct copy of said file.

18. The computer-readable medium of claim 17, have stored thereon further instructions that further configure the processor to, prior to generating said member widget, providing a client-side secure file-transfer application to said remote member device.

19. The computer-readable medium of claim 17, have stored thereon further instructions that further configure the processor to:
   provide a client-side secure file-transfer application to said remote sender device, said client-side secure file-transfer application being provided in a restricted mode; and
   receive, from said remote sender device via said client-side secure file-transfer application, non-member credentials associated with a non-member with whom said remote sender device is associated.

20. The computer-readable medium of claim 17, have stored thereon further instructions that further configure the processor to:
   receive, from said remote member device, a request to sponsor said non-member as having a professional relationship with said verified-professional member; and
   in response to receiving said request:
      provide said non-member credentials to said remote member device; and
      update said client-side secure file-transfer application to a sponsored mode.

21. The computer-readable medium of claim 17, have stored thereon further instructions that further configure the processor to, prior to receiving said request for said file:
   receive, from said remote member device, a pending-files query; and
   in response to receiving said query, retrieve said metadata associated with said file from said data store and providing said metadata for retrieval by said remote member device.

22. The computer-readable medium of claim 17, have stored thereon further instructions that further configure the processor to permanently deleting said encrypted copy from said data store when said unconfirmed cryptographic integrity code is determined to match said reference cryptographic integrity code.

23. A computing apparatus for secure file exchange, the apparatus comprising:
   a processor; and
   a memory storing instructions that, when executed by the processor, configure the apparatus to:
      obtain, from a remote member device, new-member information including identity information and a professional credential associated with a new member;
      verify, according to said identity information, that said new member has a personal identity as indicated by said identity information, and that said new member has a professional designation as indicated by said professional credential;
      when said new member's personal identity and professional designation have been verified, designate said new member as a verified-professional member and obtaining a member public key of a public/private key pair for said verified-professional member;

generate a member widget indicating said verified-professional member's status as a verified professional and being configured to accept files submitted for secure transfer to said verified-professional member;

provide said member widget for publication by said new member;

receive an indication, via said published member widget, to provide a file from a remote sender device to said verified-professional member;

obtain, from said remote sender device via said published member widget, metadata associated with said file;

obtain a reference cryptographic integrity code derived from said file;

obtain, from said remote sender device via said published member widget, an encrypted copy of said file, said encrypted copy being encrypted with said member public key; and store said metadata, said reference cryptographic integrity code, and said encrypted copy in a non-transient data store;

receive, from said remote member device, a request for said file; and in response to said request:
  retrieve said encrypted copy from said data store;
  send said encrypted copy to said remote member device for decryption, according to said private key, into an unconfirmed unencrypted file;
  receive, from said remote member device, an unconfirmed cryptographic integrity code derived from said unconfirmed unencrypted file;
  determine whether said unconfirmed cryptographic integrity code matches said reference cryptographic integrity code; and
  when said unconfirmed cryptographic integrity code is determined to match said reference cryptographic integrity code, confirm to said remote member device that said unconfirmed unencrypted file is a correct copy of said file.

24. The apparatus of claim 23, wherein the memory stores further instructions that further configure the apparatus to, prior to generating said member widget, provide a client-side secure file-transfer application to said remote member device.

25. The apparatus of claim 23, wherein the memory stores further instructions that further configure the apparatus to:
  provide a client-side secure file-transfer application to said remote sender device, said client-side secure file-transfer application being provided in a restricted mode; and
  receive, from said remote sender device via said client-side secure file-transfer application, non-member credentials associated with a non-member with whom said remote sender device is associated.

26. The apparatus of claim 23, wherein the memory stores further instructions that further configure the apparatus to:
  receive, from said remote member device, a request to sponsor said non-member as having a professional relationship with said verified-professional member; and
  in response to receiving said request:
    provide said non-member credentials to said remote member device; and
    update said client-side secure file-transfer application to a sponsored mode.

27. The apparatus of claim 23, wherein the memory stores further instructions that further configure the apparatus to, prior to receiving said request for said file:
  receive, from said remote member device, a pending-files query; and
  in response to receiving said query, retrieve said metadata associated with said file from said data store and providing said metadata for retrieval by said remote member device.

28. The apparatus of claim 23, wherein the memory stores further instructions that further configure the apparatus to permanently delete said encrypted copy from said data store when said unconfirmed cryptographic integrity code is determined to match said reference cryptographic integrity code.

* * * * *